US010735639B2

(12) United States Patent
Watanabe et al.

(10) Patent No.: US 10,735,639 B2
(45) Date of Patent: Aug. 4, 2020

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventors: Kenta Watanabe, Kawasaki (JP); Kaori Ikeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 16/017,194

(22) Filed: Jun. 25, 2018

(65) Prior Publication Data

US 2019/0007596 A1   Jan. 3, 2019

(30) Foreign Application Priority Data

Jun. 29, 2017   (JP) ................................ 2017-128041
Mar. 7, 2018    (JP) ................................ 2018-041194
Mar. 7, 2018    (JP) ................................ 2018-041195

(51) Int. Cl.
*H04N 5/232* (2006.01)
*H04N 1/00* (2006.01)

(52) U.S. Cl.
CPC ..... *H04N 5/23203* (2013.01); *H04N 1/00307* (2013.01); *H04N 5/23229* (2013.01); *H04N 2201/0046* (2013.01); *H04N 2201/0065* (2013.01); *H04N 2201/0084* (2013.01)

(58) Field of Classification Search
CPC ... H04N 1/00; H04N 5/23203; H04N 5/23229
See application file for complete search history.

(56) References Cited

U.S. PATENT DOCUMENTS

| 9,591,164 B2 * | 3/2017 | Shimizu | .................... G06F 9/44 |
| 9,883,248 B2 * | 1/2018 | Kitazato | .................. H04N 5/44 |
| 2003/0099456 A1 * | 5/2003 | Ohmura | ............... G11B 19/025 |
| | | | 386/216 |
| 2004/0046984 A1 * | 3/2004 | Azami | ..................... H04N 1/00 |
| | | | 358/1.13 |

(Continued)

FOREIGN PATENT DOCUMENTS

JP        2014-86844 A     5/2014

*Primary Examiner* — Amy R Hsu
(74) *Attorney, Agent, or Firm* — Canon U.S.A., Inc. IP Division

(57) ABSTRACT

An information processing apparatus including a plurality of installed application programs activates, when a first application program is executed for using data, a second application program used to obtain the data from an external apparatus. A process of connection to the external apparatus is executed by executing the second application program, and a data format and attribute information stored in the external apparatus are obtained from the external apparatus by executing the second application program. The attribute information on data stored in the external apparatus is displayed on a screen of the second application program such that a result of a determination as to whether the data is usable by the first application program is recognizable based on a format stored in the memory and a format obtained from the external apparatus by executing the second application program.

13 Claims, 24 Drawing Sheets

(56) References Cited

U.S. PATENT DOCUMENTS

| | | | | |
|---|---|---|---|---|
| 2010/0251308 A1* | 9/2010 | Ohki | ............... | H04H 60/73 |
| | | | | 725/54 |
| 2014/0043540 A1* | 2/2014 | Kitazato | ............... | H04N 5/44 |
| | | | | 348/723 |
| 2015/0153982 A1* | 6/2015 | Berarducci | ............... | H04N 1/00 |
| | | | | 358/1.15 |

* cited by examiner

| App ID | Format List |
|---|---|
| 0x41 | {JPG,MP4} |
| 0x53 | {MOV,MP4,AVI} |
| 0x9F | {RAW} |
| 0xB5 | {JPG,RAW,TIFF,MOV,MP4,AVI} |

| App ID | Image Type List | App Name |
|---|---|---|
| 0x41 | { (RAW,Large),(JPG,Small) } | Picture Editor A |
| 0x53 | { (JPG,Small),(JPG,Large),(TIFF, Small) } | Picture Editor B |
| 0x9F | { (JPG,Anything) } | Picture Editor C |
| 0xB5 | { (JPG,Large),(RAW,Large),(TIFF, Anything),(MP4,Small),(AVI, Anything) } | Picture Editor D |

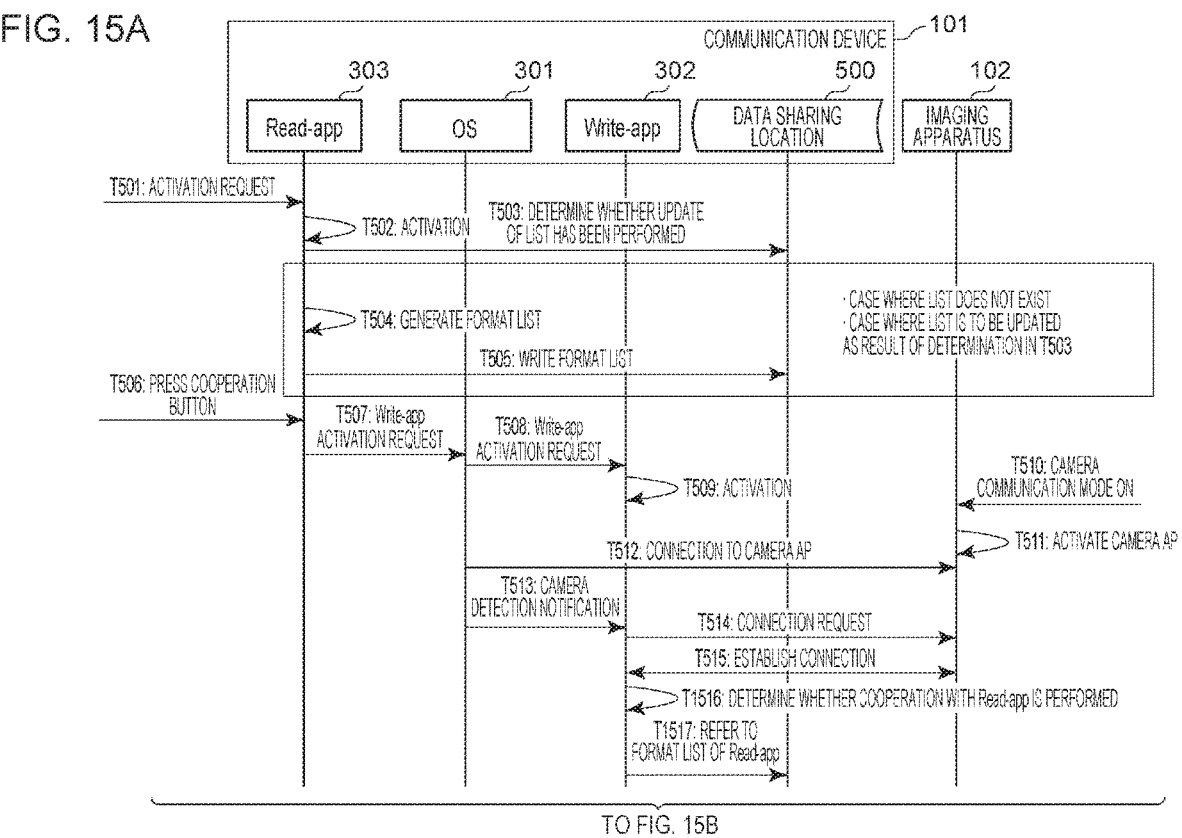

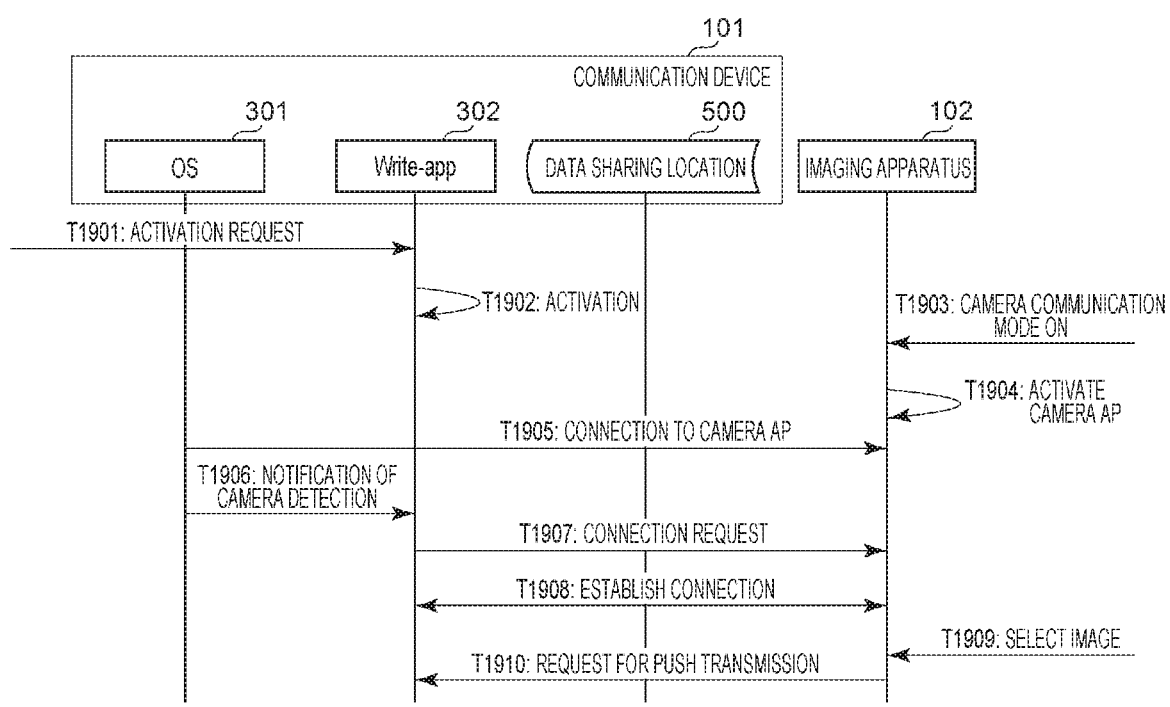

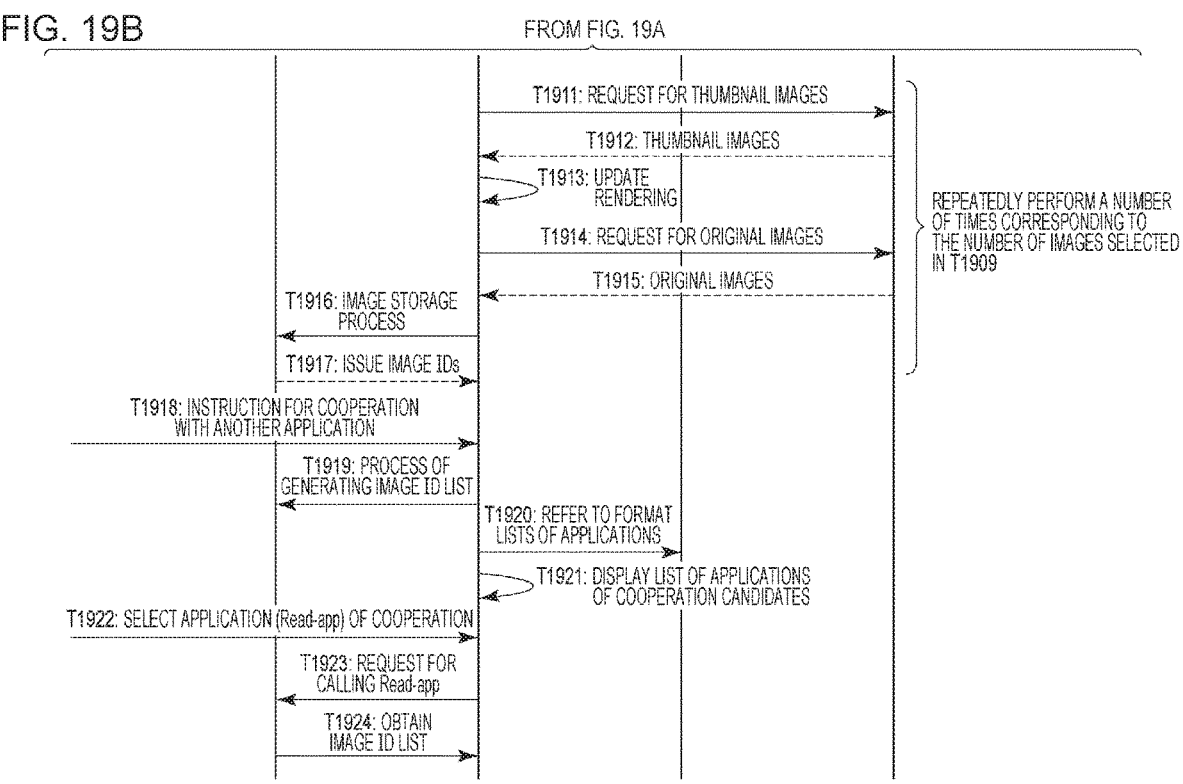

INFORMATION PROCESSING APPARATUS, INFORMATION PROCESSING METHOD, AND PROGRAM

BACKGROUND

Field of the Disclosure

The present disclosure particularly relates to an information processing apparatus, an information processing method, and a program which are suitable for a process performed using a plurality of applications.

Description of the Related Art

Information processing apparatuses, such as smart phones, may realize various functions by installing operating systems (OSs) and a plurality of applications and operating by means of the applications. Such an information processing apparatus may be connected to a camera by means of a camera connection application so as to obtain images and edit images by means of an image editing application, for example. In Japanese Patent Laid-Open No. 2014-86844 discloses a communication apparatus which communicates with a digital still camera by means of a camera connection application.

The plurality of applications may support different data formats.

For example, a first application which performs a process of obtaining an image from a camera for an information processing apparatus and a second application which performs a process of editing the image will be described. The information processing apparatus obtains an image from a camera when the second application activates the first application to obtain data to be edited. If the second application is not compatible with the image, the image may not be edited, and therefore, the obtained image is wasted.

Accordingly, it is desirable to prevent a process of obtaining wasted data while data is obtained from an external apparatus in corporation with a plurality of applications.

SUMMARY

According to an aspect of the present disclosure, an information processing apparatus including a plurality of installed application programs includes an activation unit configured to activate, when a first application program is executed for using data, a second application program used to obtain the data from an external apparatus, a storage unit configured to store a data format usable by the first application program in a memory, a connection processing unit configured to execute a process of connection to the external apparatus by executing the second application program, an obtaining unit configured to obtain a data format and attribute information stored in the external apparatus from the external apparatus by executing the second application program, and a display unit configured to display the attribute information on data stored in the external apparatus on a screen of the second application program such that a result of a determination as to whether the data is usable by the first application program is recognizable based on a format stored in the memory and a format obtained from the external apparatus by executing the second application program.

Further features of the present invention will become apparent from the following description of exemplary embodiments with reference to the attached drawings.

BRIEF DESCRIPTION OF THE DRAWINGS

FIGS. 15A and 15B illustrate an example of a sequence of a process performed when a central processing unit (CPU) of the communication device activates Write-app by means of Read-app and an external apparatus performs PUSH transmission according to an embodiment of the present disclosure.

FIGS. 19A and 19B are a diagram illustrating an example of a sequence a process of activating Read-app by means of Write-app performed by a CPU of a communication device after PUSH transmission is performed by an external apparatus and an image is obtained by the communication device through Write-app according to an embodiment of the present disclosure.

DESCRIPTION OF THE EMBODIMENTS

Preferred embodiments of the present disclosure will be illustrated in detail hereinafter with reference to the accompanying drawings. Note that components described in the embodiments are merely examples, and the scope of the present disclosure is not limited to these.

First Embodiment

Hereinafter, a first embodiment of the present disclosure will be described with reference to the accompanying drawings. In this embodiment, a case where a user activates an image editing application by operating a communication device (a smartphone) serving as an information processing apparatus and activates a data obtaining application will be described as an example. Note that the term "activation" of an application in this embodiment indicates a case where an inactivated application is activated and a case where an application operated in a background is switched to a foreground.

Network Configuration

Figure 1:
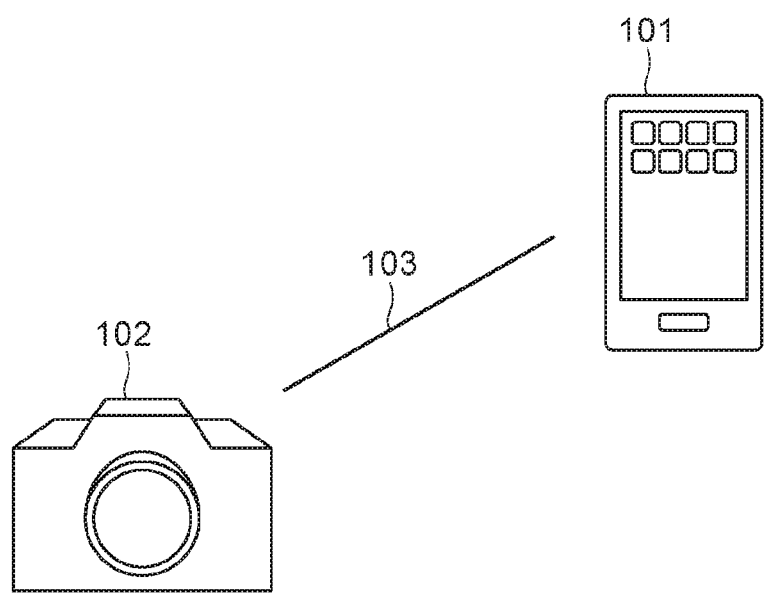
FIG. 1 is a diagram illustrating an example of a configuration of a network including a communication device according to an embodiment of the present disclosure.

FIG. 1 is a diagram illustrating an example of a configuration of a system including a communication device 101 according to this embodiment.

As illustrated in FIG. 1, the communication device 101 is connected to an imaging apparatus 102 through a data obtaining application so as to obtain an image from the imaging apparatus 102 through a network 103. Note that wired communication or wireless communication is used for the connection to the imaging apparatus 102.

Configuration of Communication Device

Figure 2:
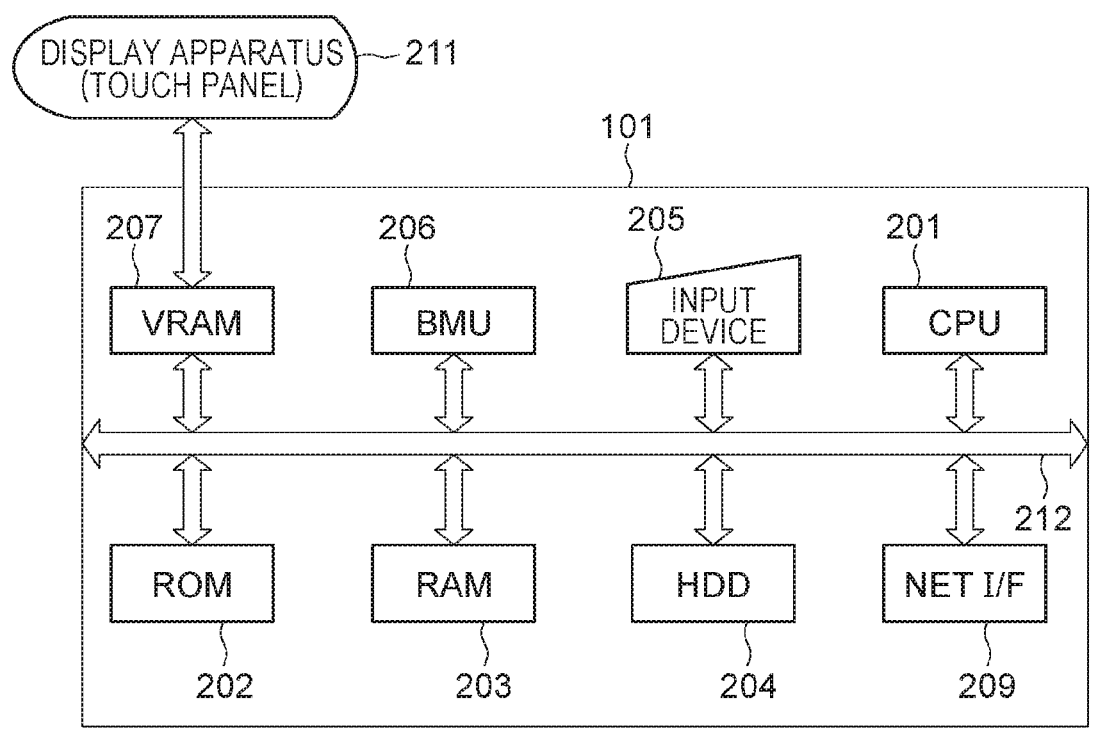
FIG. 2 is a block diagram illustrating an example of a hardware configuration of the communication device according to an embodiment of the present disclosure.

FIG. 2 is a block diagram illustrating an example of a hardware configuration of the communication device 101 according to this embodiment.

In FIG. 2, a central processing unit (CPU) 201 controls the entire communication device 101. A read only memory (ROM) 202 stores various control programs to be executed by the CPU 201 and data. A random access memory (RAM) 203 includes a work area of the CPU 201, a save area for data in an error process, and a load area for control programs. A hard disk drive (HDD) 204 stores an operating system (OS), various applications, control programs executed in the communication device 101, content, and data.

An input device 205 includes various buttons including a button for performing switching between ON/OFF states of a power source. A bit move unit (BMU) 206 controls data transfer between memories (between a video RAM (VRAM) 207 and other memories), data transfer between the memories and various I/O devices (a NET interface (I/F) 209, for example). Image data to be displayed in a display apparatus 211 is rendered in the VRAM 207. The image data rendered in the VRAM 207 is transferred to the display apparatus 211 in accordance with a predetermined rule so that an image is displayed in the display apparatus 211. The display apparatus 211 has a touch panel. When the user touches a display surface of the display apparatus 211, an instruction associated with an icon displayed in a position where the user has touched is input. The NET I/F 209 performs communication with the imaging apparatus 102 through the network 103. A bus 212 includes an address bus, a data bus, and a control bus.

Figure 3:
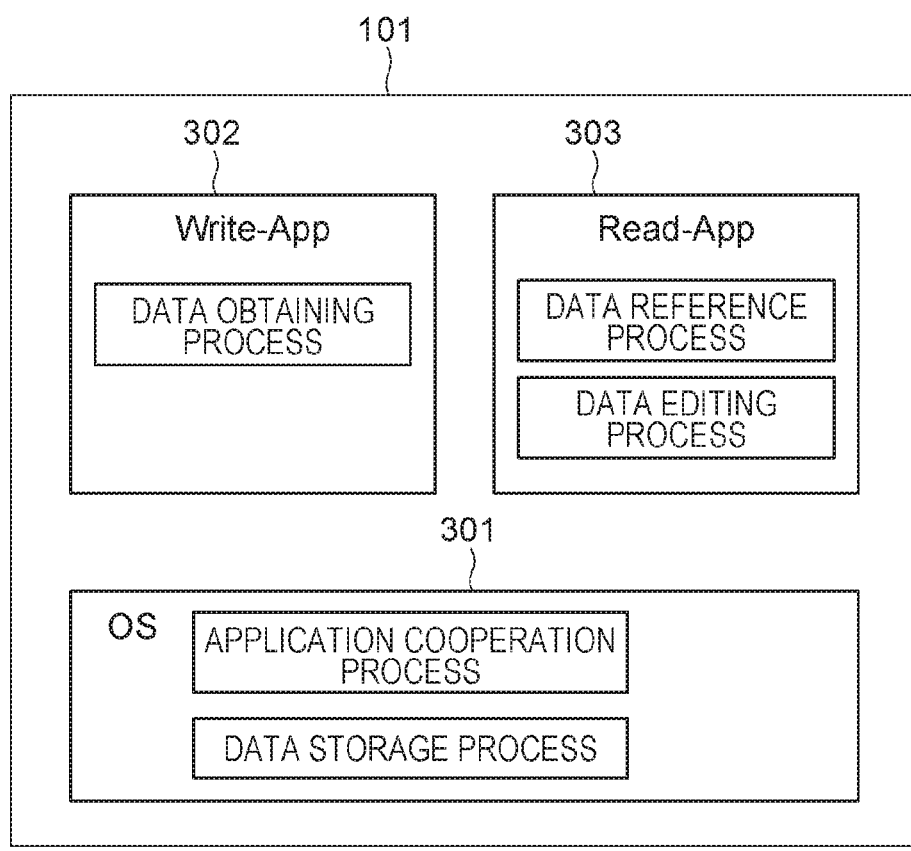
FIG. 3 is a block diagram illustrating an example of a software configuration of the communication device according to an embodiment of the present disclosure.

FIG. 3 is a diagram illustrating an example of a software configuration of software of the communication device 101 according to this embodiment.

The communication device 101 includes a predetermined OS 301. A data obtaining application (hereinafter referred to as "Write-app") 302 and an image editing application (hereinafter referred to as "Read-app") 303 are installed in the communication device 101. The CPU 201 of the communication device 101 activates the OS 301 so as to perform a basic process of the communication device 101, and in addition, performs cooperated processes of installed applications and a process of recording data in the HDD 204 or the like. Furthermore, the CPU 201 of the communication device 101 activates Write-app 302 so as to perform a process of obtaining an image from the imaging apparatus 102 through the NET I/F 209, for example. The CPU 201 of the communication device 101 also activates Read-app 303 so as to process the obtained image or perform a process of instructing a printing apparatus to print the image. Here, Write-app 302 is an application for input and is also an application for output. Note that a plurality of Read-apps 303 may be installed in the communication device 101, and one of the Read-apps 303 will be described as an example in this embodiment.

Configuration of Imaging Apparatus

Figure 4A:
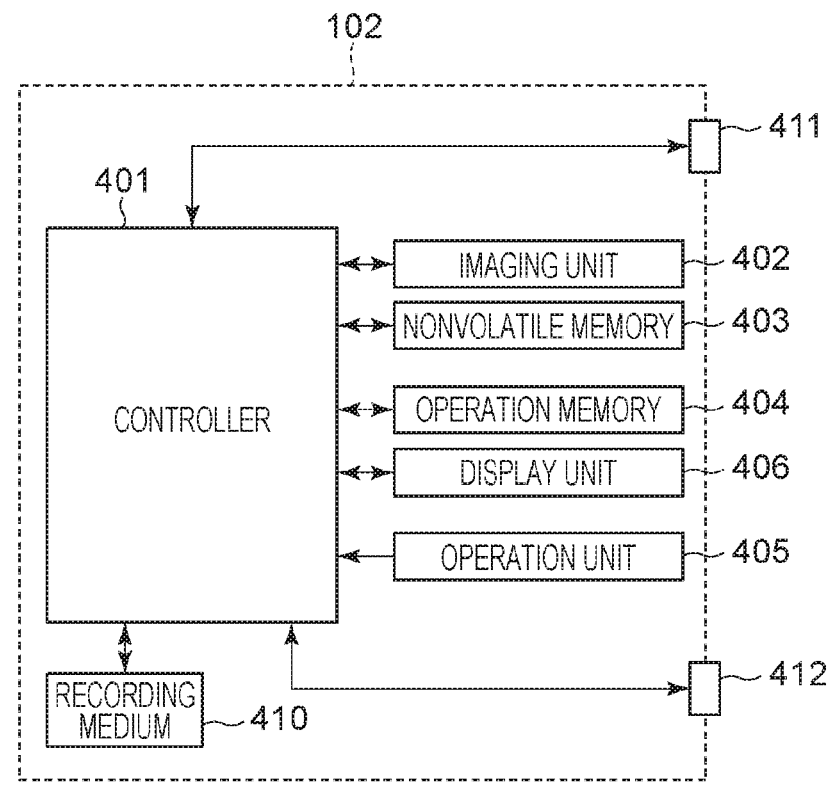
FIGS. 4A to 4C are block diagrams illustrating an example of a hardware configuration of an imaging apparatus according to an embodiment of the present disclosure.

FIG. 4A is a block diagram illustrating an example of a configuration of the imaging apparatus 102 which is an example of the external apparatus according to this embodiment. Although the imaging apparatus will be described as the example of the external apparatus in this specification, the external apparatus is not limited to this. The external apparatus may be an information processing apparatus, such as a portable media player, a so-called tablet device, or a personal computer.

A controller 401 controls various units of the imaging apparatus 102 in accordance with input signals and programs described below. Note that, instead of the controller 401, a plurality of hardware devices may control the entire apparatus by sharing processes.

An imaging unit 402 includes, for example, an optical lens unit, an optical system which controls aperture, zoom, focus, and the like, and an imaging element which converts light (video images) obtained through the optical lens unit into an electric video signal. As the imaging element, a complementary metal oxide semiconductor (CMOS) or a change coupled device (CCD) is generally used. The imaging unit 402 is controlled by the controller 401 so as to convert object light which forms an image on a lens included in the imaging unit 402 into an electric signal using the imaging element, perform a noise reduction process on the electric signal, and output digital data as image data. The imaging apparatus 102 of this embodiment records image data in a recording medium 410 in accordance with a standard of the design rule for camera file system (DCF).

A nonvolatile memory 403 is electrically erasable and recordable and stores programs to be executed by the controller 401 described below and the like.

A work memory 404 is used as a buffer memory which temporarily stores image data obtained by the imaging unit 402, a memory for image display of a display unit 406, a work area of the controller 401, and the like.

An operation unit 405 is used to receive an instruction issued by a user to the imaging apparatus 102. The operation unit 405 includes, for example, a power source button used by the user to instruct ON/OFF of a power source of the imaging apparatus 102, a release switch used by the user to instruct imaging, and a reproduction button used by the user to instruct reproduction of image data. The operation unit 405 further includes an operation member, such as a dedicated connection button used to start communication with an external device through a communication unit 411 described below. Furthermore, a touch panel formed on the display unit 406 described below is included in the operation unit 405. The release switch includes switches SW1 and SW2. When the release switch is pressed halfway, the switch SW1 is turned ON. By this, an instruction for performing imaging preparation including an autofocus (AF) process, an automatic exposure (AE) process, an automatic white balance (AWB) process, and an EF (flash preliminary light emission) process, is received. When the release switch is fully pressed, the switch SW2 is turned ON. By this, an instruction for imaging is received.

The display unit 406 performs display of a viewfinder image at a time of imaging, display of obtained image data, display of characters used for a dialogical operation, and the like. Note that the display unit 406 may not be incorporated in the imaging apparatus 102. The imaging apparatus 102 may be connected to the internal or external display unit 406 and at least has a display control function of controlling display of the display unit 406.

The recording medium 410 may record image data output from the imaging unit 402. The recording medium 410 may be detachable from the imaging apparatus 102 or incorporated in the imaging apparatus 102. Specifically, the imaging apparatus 102 at least has a unit for accessing the recording medium 410.

The communication unit 411 is an interface for connection to an external apparatus. The imaging apparatus 102 of this embodiment may perform transmission and reception of data with the external apparatus through the communication unit 411. For example, image data generated by the imaging unit 402 may be transmitted to the external apparatus through the communication unit 411. Furthermore, imaging performed by the imaging unit 402 may be controlled by the external apparatus through the communication unit 411. Note that the communication unit 411 includes an interface for communication through a wireless local area network (LAN) based on the standard of IEEE 802.11 with the external apparatus. The controller 401 realizes wireless communication with the external apparatus by controlling the communication unit 411.

A short-distance wireless communication unit 412 includes, for example, an antenna for the wireless communication, a modulation/demodulation circuit which processes a wireless signal, and a communication controller. The short-distance wireless communication unit 412 outputs a modulated wireless signal from the antenna and demodulates the wireless signal received by the antenna so as to realize short-distance wireless communication based on the standard of IEEE 802.15 (so called Bluetooth (registered trademark)). In this embodiment, Bluetooth Low Energy version 4.0 (hereinafter referred to as BLE) which consumes small electric power is employed as Bluetooth communication. The BLE communication has a communication available range smaller than that of the wireless LAN communication (that is, a communication available distance of the BLE communication is short). Furthermore, a communication speed of the BLE communication is lower than that of the wireless LAN communication. On the other hand, the BLE communication consumes smaller electric power than the wireless LAN communication. The imaging apparatus 102 of this embodiment may perform transmission and reception of data with the external apparatus through the short-distance wireless communication unit 412. Furthermore, imaging performed by the imaging unit 402 may be controlled by the external apparatus through the communication unit 411. However, since the communication speed is low, image data generated by the imaging unit 402 is not transmitted.

Note that the communication unit 411 of the imaging apparatus 102 of this embodiment has an AP mode for operating as an access point in an infrastructure mode and a CL mode for operating as a client in the infrastructure mode. When the communication unit 411 operates in the CL mode, the imaging apparatus 102 of this embodiment may operate as a CL device in the infrastructure mode. When the imaging apparatus 102 operates as the CL device, the imaging apparatus 102 may be added to a network formed by a peripheral AP device by being connected to the AP device. Furthermore, the imaging apparatus 102 of this embodiment may operate as a simple AP (hereinafter referred to as a "simplified AP") having limited functions which is a type of AP. When the imaging apparatus 102 operates as the simplified AP, the imaging apparatus 102 forms a network. Peripherals of the imaging apparatus 102 may recognize that the imaging apparatus 102 is an AP device and may be added to the network formed by the imaging apparatus 102. It is assumed that programs for operating the imaging apparatus 102 as described above are stored in the nonvolatile memory 403.

Although the imaging apparatus 102 of this embodiment is a type of AP, the imaging apparatus 102 is a simplified AP which does not have a gateway function of transferring data received from a CL device to an internet provider. Accordingly, even if the imaging apparatus 102 receives data from one of the other apparatuses included in the network formed by the imaging apparatus 102, the imaging apparatus 102 does not transfer the data to another network, such as the Internet.

Figure 4B:
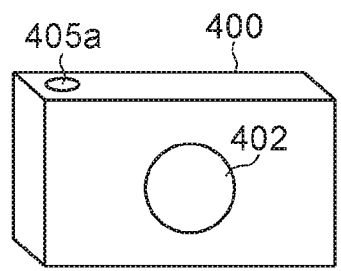
Figure 4C:
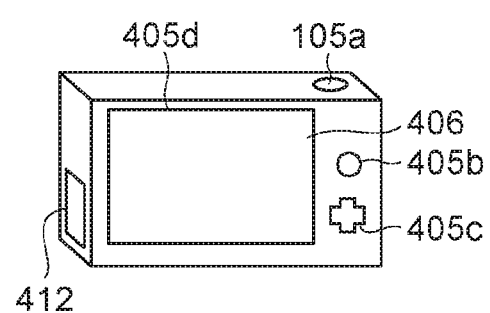

Next, appearance of the imaging apparatus 102 will be described. FIGS. 4B and 4C are diagrams illustrating an example of appearance of the imaging apparatus 102. A release switch 405a, a reproduction button 405b, a direction key 405c, and a touch panel 405d are operation members included in the operation unit 405 described above. An image obtained as a result of imaging performed by the imaging unit 402 is displayed in the display unit 406. The imaging apparatus 102 of this embodiment has an antenna portion of the short-distance wireless communication unit 412 on a side of a camera case. When the short-distance wireless communication unit 412 is positioned close to a short-distance wireless communication unit 412 of another device, short-distance wireless communication with the other device may be established. By this, contactless communication may be performed without using a cable or the like, and in addition, a communication partner may be restricted as desired by the user.

Processing Procedure of Communication Device

Next, a procedure of a process performed by the communication device 101 according to this embodiment will be described with reference to FIGS. 5 to 8F. In this embodiment, a process of activating Read-app, receiving a user's instruction in a screen for performing a process of Read-app, and calling Write-app which is performed by the CPU 201 of the communication device 101 will be described.

Figure 5:
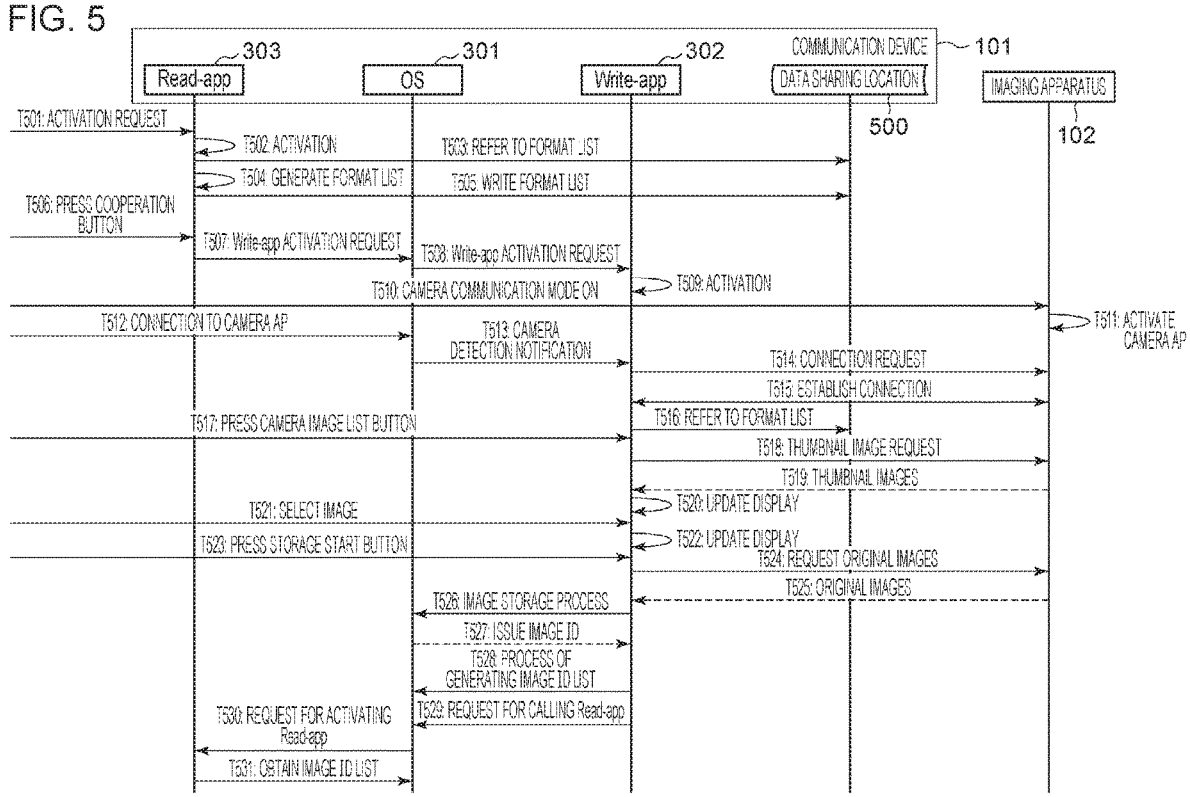
FIG. 5 is a diagram illustrating an example of a sequence of a process of activating Write-app by means of Read-app, obtaining an image included in a camera by Write-app, and supplying the image to Read-app according to an embodiment of the present disclosure.

FIG. 5 is a sequence diagram of a procedure of a process of activating Write-app after activating Read-app, obtaining an image from the external apparatus, and supplying the obtained image for an image editing process to Read-app which is performed by the CPU 201 of the communication device 101. Note that, the process described below is realized when the CPU 201 of the communication device 101 activates the OS 301, Write-app 302, and Read-app 303, operates in accordance with the OS 301, Write-app 302, and Read-app 303 where appropriate, and controls the various units.

Note that, for simplicity of description, a period from T501 to T509 is determined as a cooperation start phase, a period from T510 to T516 is determined as a connection phase, a period from T517 to T527 is determined as an image storage phase, and a period from T528 to T531 is determined as a cooperation termination phase.

First, the cooperation start phase from T501 to T509 will be described.

In T501, the CPU 201 of the communication device 101 receives a request for activating Read-app issued by a user operation.

In T502, a process is started when the CPU 201 activates Read-app in response to the activation request in T501. When activating Read-app, the CPU 201 displays a screen illustrated in FIG. 7A in the display apparatus 211. In the screen illustrated in FIG. 7A, the user selects editing content to be executed through the touch panel of the display apparatus 211.

Figure 7A:
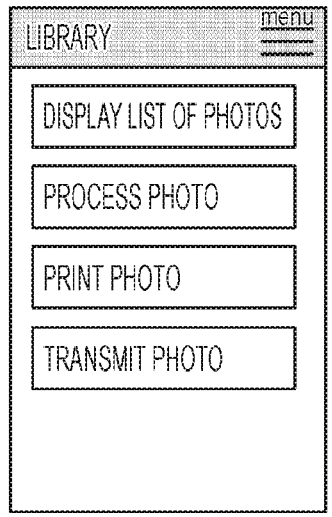
FIGS. 7A to 7E are diagrams illustrating examples of a display screen of Read-app according to an embodiment of the present disclosure.
Figure 7B:
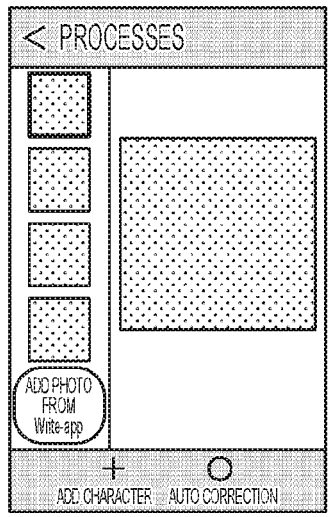
Figure 7C:
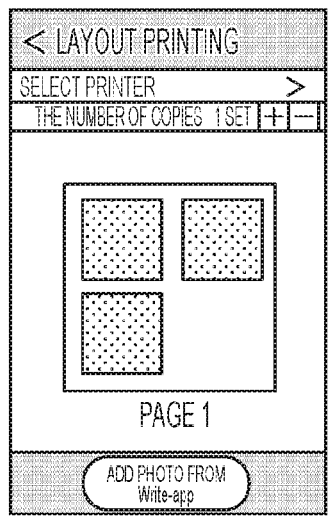
Figure 7D:
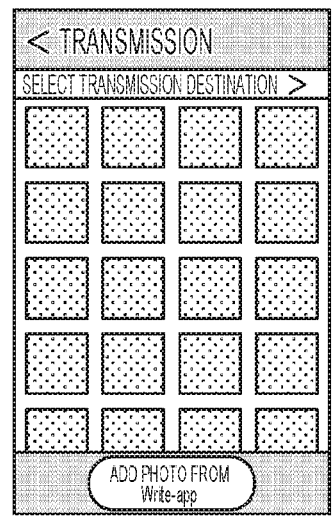
Figure 7E:
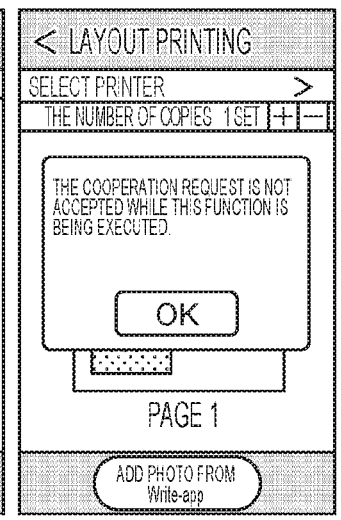

When "Process Photo" is selected, for example, a screen illustrated in FIG. 7B is displayed in the display apparatus 211, and when "Print Photo" is selected, a screen illustrated in FIG. 7C is displayed in the display apparatus 211. Furthermore, when "Transmit Photo" is selected, a screen illustrated in FIG. 7D is displayed in the display apparatus 211. In the screens illustrated in FIGS. 7B to 7D, an image to be edited may be selected from among images stored in the HDD 204 or the like. On the other hand, when an image which is not stored in the communication device 101 is to be edited, an "Add Photo from Write-app" button 702 is selected so that an image is obtained from the external apparatus. The process illustrated in FIG. 5 is started when the user selects the "Add Photo from Write-app" button 702.

In T503 of FIG. 5, the CPU 201 determines whether a format list representing data formats supported by Read-app is included in a data sharing location 500. When the determination is affirmative, the CPU 201 compares the format list of Read-app stored in the data sharing location 500 with information indicating supported data formats of set in Read-app so as to determine a change has been made. Note that the information indicating formats set in Read-app is stored in the HDD 204 when Read-app is installed, and in addition, is externally received through the Internet or the like when version-up of Read-app is performed so that the information is updated.

The data sharing location 500 and the format list will now be described in detail.

Figures 6A, 6B:
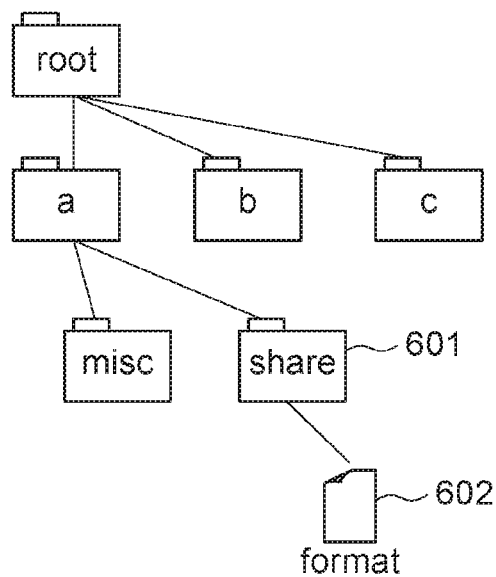
FIGS. 6A and 6B are diagrams illustrating examples of a data sharing location and a configuration of a data list according to an embodiment of the present disclosure.

First, the data sharing location 500 which is a predetermined storage region readable and writable by various applications will be described with reference to FIG. 6A. FIG. 6A is a diagram illustrating an example of a directory configuration of the HDD 204. In FIG. 6A, a reference numeral 601 denotes a data sharing location folder. In this embodiment, a format list 602 of various cooperation applications including Read-app and Write-app is written below the data sharing location folder 601. The data sharing location folder 601 and the format list 602 are readable and writable by the cooperation applications including Read-app and Write-app. The various cooperation applications store a file path of the format list 602 ("/root/a/share/format" in the example of FIG. 6A). When the cooperation applications are activated, a file of the format list 602 in a file path destination is referred to. Thereafter, the file of the format list 602 is compared with a format of latest supported data set in the cooperation applications. When a difference is detected, it is determined that a change has been made.

The data sharing location 500 has been described hereinabove.

Next, the format list will be described with reference to FIG. 6B. FIG. 6B is a diagram illustrating an example of the format list 602. The format list includes an application ID 651 and a supported data format array 652. The application ID 651 is unique to an application recorded in the HDD 204 when the application is installed in the communication device 101. Data formats supported by an application 653 having an application ID of 0x41 is JPG and MP4, and other data formats are not supported. The format list has been described hereinabove. Note that, although the case where the format list indicates data formats "supported" by individual applications (such as Read-app) is illustrated in this embodiment, data formats which are "not supported" by individual applications may be listed.

The description now returns to the sequence illustrated in FIG. 5.

When it is determined that the format list 602 of Read-app is not included in the data sharing location 500 or the format list 602 is included but has been modified, a process in T504 and T505 are executed.

In T504, the CPU 201 generates a format list based on the supported data formats set in Read-app. In T505, the format list generated in T504 is written in the data sharing location 500 after being associated with a unique ID of Read-app.

In this case, when it is determined that the format list 602 of Read-app is not included in the data sharing location 500 in T503, the list generated in T504 is written after being associated with the unique ID of Read-app. On the other hand, when it is determined that the format list 602 is included in the data sharing location 500 and a modification has been made in T503, the existing format list associated with the unique ID of Read-app is replaced by the format list generated in T504.

In T506, the CPU 201 detects a press of a cooperation button displayed in Read-app performed by the user. In an example of FIG. 7B, the "Add Photo from Write-app" button 702 corresponds to the cooperation button.

In T507, the CPU 201 detects the press of the cooperation button performed by the user and transmits a request for activating Write-app by means of Read-app to the OS 301. Here, the activation request includes the application ID of Read-app as information indicating a source of the request of cooperation, and the CPU 201 stores the received application ID of Read-app in the RAM 203. In T508, the CPU 201 receives a request for activating Write-app from the OS 301. Note that, although the activation request including the application ID of Read-app is transmitted in this embodiment, the present disclosure is not limited to this. For example, the application ID of Read-app may be stored as information indicating a source of a request for cooperation in a temporary location included in the HDD 204 and a path to the storage destination may be transmitted to the OS 301 after being added in the activation request. The CPU 201 stores the application ID of Read-app obtained in accordance with the path in the RAM 203.

Figure 8A:
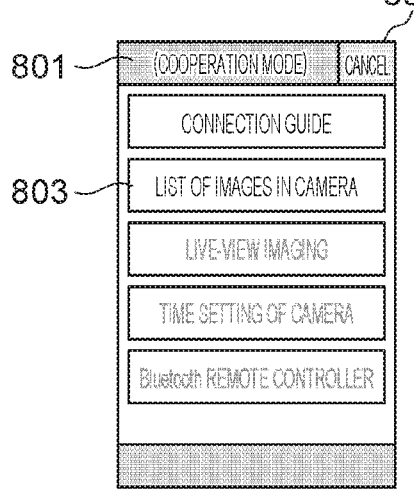
FIGS. 8A to 8F are diagrams illustrating examples of a display screen of Write-app according to an embodiment of the present disclosure.

Subsequently, in T509, the CPU 201 activates Write-app. When Write-app is activated, a screen of Write-app is displayed as illustrated in FIG. 8A. As illustrated in FIG. 8A, when Write-app is activated for cooperation in response to the request from Read-app, the CPU 201 causes Write-app to enter the cooperation mode. Note that when Write-app has been activated and operates in a background, the CPU 201 switches Write-app into a foreground operation so that Write-app operates in the cooperation mode. While Write-app operates in the cooperation mode, a status bar 801 is displayed so that the user recognizes Write-app in the cooperation mode. When Write-app operates in the cooperation mode, Write-app preferentially performs an operation of obtaining an image from the imaging apparatus 102, and therefore, only a guide function for connection to a camera and an image list function for displaying images in the camera are available as illustrated in FIG. 8A. On the other hand, when the user simply activates Write-app in a normal mode, all functions illustrated in FIG. 8A are available, and UI display corresponding to the functions is performed. Note that when a press of a cancel button 802 performed by the user is detected, the CPU 201 cancels the cooperation mode of Write-app and brings Write-app into the normal mode.

The cooperation start phase has been described hereinabove.

Second, the connection phase from T510 to T516 will be described.

When the imaging apparatus 102 turns on a communication mode in accordance with an operation performed by the user on the imaging apparatus 102 in T510, the imaging apparatus 102 activates a function of an access point in T511.

In T512, the communication device 101 is connected to the access point of the imaging apparatus 102 in response to an operation performed by the user on the communication device 101.

In T513, the CPU 201 receives a notification indicating that the imaging apparatus 102 has been detected using Write-app from the OS. In T514, the CPU 201 transmits a connection request to the imaging apparatus 102.

In T515, the imaging apparatus 102 authenticates the communication device 101 so that connection between the imaging apparatus 102 and the communication device 101 is established.

In T516, the CPU 201 reads the application ID of Read-app obtained in T508 from the RAM 203 and refers to the format list stored in the data sharing location 500 based on the application ID. The CPU 201 obtains a supported data format corresponding to Read-app from the format list and stores the data format in the RAM 203.

The connection phase has been described hereinabove. Although the case where the process in T516 is performed when the connection to the imaging apparatus 102 is completed has been described, the present disclosure is not limited to this. The process in T516 may be performed when Write-app is activated in T509 or when rendering update is performed in T520 described below.

Third, the image storage phase from T517 to T527 will be described.

In T517, the CPU 201 detects a press of an image list button 803 for displaying images in the camera illustrated in FIG. 8A.

In T518, when the button pressing event is performed in T517, the CPU 201 transmits a request for obtaining attribute information corresponding to captured images (original images or original data) recorded in the recording medium 410 of the imaging apparatus 102 to the imaging apparatus 102 through the NET I/F 209. Although a case where the attribute information is a thumbnail image will be described in this embodiment, the present disclosure is not limited to this and the attribute information may be a file name, for example.

A format of data on the original image and a format of data on the attribute information may be the same or different from each other. For example, the original image and the thumbnail image may be still-image files of a JPEG format. Alternatively, the original image may be a moving-image file of an MP4 format and the attribute information may be a still-image file of the JPEG format extracted from the moving-image file. In this embodiment, at least the format of the thumbnail image (still-image data) which is one of the attribute information of the original image is supported by Write-app irrespective of whether the format of the original image is supported by Read-app.

In T519, the CPU 201 receives thumbnail images and information indicating formats of the original images corresponding to the individual thumbnail images from the imaging apparatus 102 through the NET I/F 209 and stores the information in the HDD 204. In T520, the thumbnail images stored in the HDD 204 are read and displayed in the display apparatus 211. Here, a UI illustrated in FIG. 8B is displayed in Write-app.

Note that the process from T518 to T520 is repeatedly executed on the thumbnail images displayed in a rendering region of the display apparatus 211. Specifically, every time a display range is scrolled in a vertical direction to change a position of the display range by the user, the process from T518 to T520 is repeatedly performed on the thumbnail images which are newly rendered.

Figure 8B:
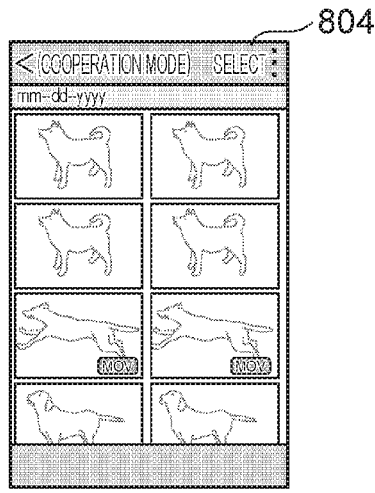

In T521, the CPU 201 detects a press, by the user, of a selection button 804 illustrated in FIG. 8B.

Figure 8C:
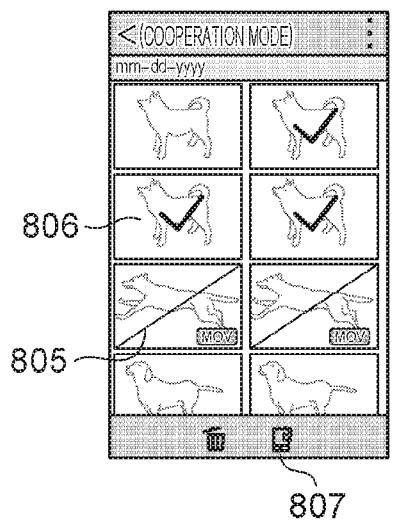

In T522, the CPU 201 brings Write-app into a selection mode and updates the display on the screen. In this case, a thumbnail image list screen listing the plurality of thumbnail images is displayed in Write-app as illustrated in FIG. 8C. Here, the CPU 201 refers to the format list of Read-app stored in the RAM 203 in T516 and compares the format list of Read-app with formats of the data on the original images corresponding to the thumbnail images received in T519. As a result of the comparison, when the thumbnail images are displayed, the CPU 201 displays a slash 805 on a number of the thumbnail images which correspond to the original images having formats which are not supported by Read-app in an overlapping manner as illustrated in FIG. 8C so that the user may recognize whether the formats of the original images are supported by Read-app.

Figure 8D:
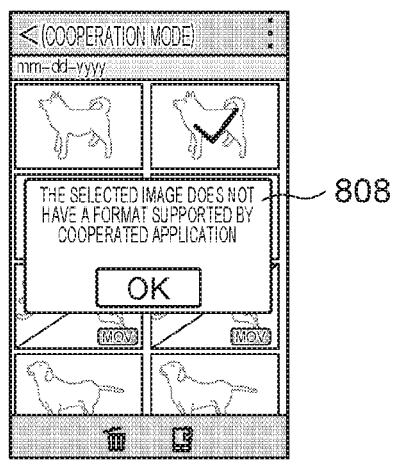

When the user selects one of the thumbnail images corresponding to the original images having the unsupported formats on which the slash 805 is overlapped, the CPU 201 displays an alert dialog 808 indicating that the selected image is not supported by Read-app as illustrated in FIG. 8D. Information on the selected thumbnail image is not added to a storage candidate image list. On the other hand, when the user selects one of the thumbnail images corresponding to the original images having the formats supported by Read-app, the CPU 201 adds information on the selected thumbnail image in the storage candidate image list which is readable from Write-app and stores the list in the RAM 203. Thereafter, the CPU 201 displays a check mark 806 indicating that an image is being selected on the thumbnail images as illustrated in FIG. 8C.

When detecting a press of a storage start button 807 illustrated in FIG. 8C performed by the user in T523, the CPU 201 transmits a request for obtaining original images based on the storage candidate image list stored in the RAM 203 to the imaging apparatus 102 through the NET I/F 209 in T524. Here, the CPU 201 switches the screen illustrated in FIG. 8C to a screen illustrated in FIG. 8E.

In T525, the CPU 201 receives the original images requested in T524 from the imaging apparatus 102 through the NET I/F 209. The thumbnail images have resolution lower than that of the original images, and therefore, data sizes of the thumbnail images are small. Therefore, when "List of Images in Camera" is to be displayed, the thumbnail images are received from the imaging apparatus 102 and are quickly displayed in the display apparatus 211. When original images having data sizes larger than those of thumbnail images are obtained from the imaging apparatus 102, only original images which have formats supported by Read-app and which are selected by the user are received. By this, reception of wasted data which may not be processed in Read-app is suppressed, and therefore, a communication load may be reduced.

When reception of the original images is completed, the CPU 201 performs a process of storing the original images using Write-app in T526. Specifically, the CPU 201 stores a file of the original images received in T525 in the HDD 204, and assigns image IDs to the original images which are newly stored in step T527. The image IDs are described as codes corresponding to file paths of storage destinations of the original images. Note that the image ID may be a file path of the storage destination.

Note that the process from the request for obtaining the original images performed in T524, the original image reception process performed in T525, the original image storage process performed in T526, to the process of issuing the image IDs corresponding to the original images performed in T527 is repeatedly performed a number of times corresponding to the number of thumbnail images selected by the user. While the series of the operations in the image storage process is performed, the CPU 201 displays a storage progress screen illustrated in FIG. 8E in the display apparatus 211.

The image storage phase has been described hereinabove. Although the case where a predetermined mark, such as a slash, is displayed in the vicinity of a thumbnail image of an original image having an unsupported format in T522 is described in this embodiment, the present disclosure is not limited to this. For example, in a thumbnail list screen in the selection mode, thumbnail images corresponding to original images having unsupported formats may not be displayed. Alternatively, a mark may be displayed in the vicinity of a thumbnail image of an original image of a format supported by Read-app.

Third, the cooperation termination phase from T528 to T531 will be described.

Figure 8E:
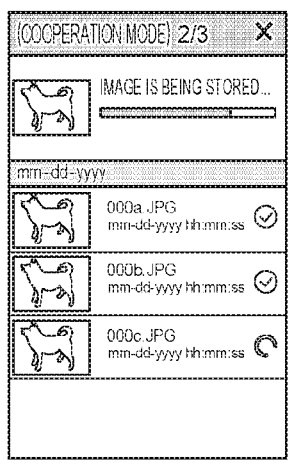
Figure 8F:
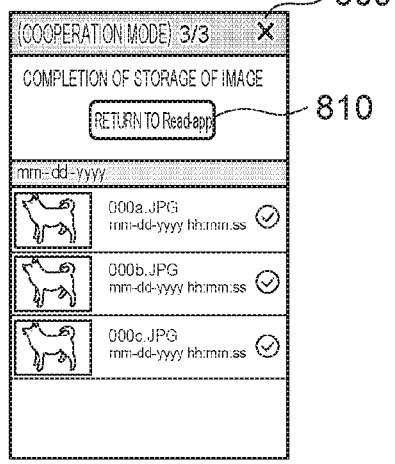

As described in the process from T524 to T527, when the process of storing all the original images corresponding to the thumbnail images selected by the user is terminated, the CPU 201 displays a storage completion screen illustrated in FIG. 8F in the display apparatus 211. When detecting a press of a close button 809 performed by the user, the CPU 201 returns to the process of displaying the screen for listing the images in the camera illustrated in FIG. 8B without executing a process of generating an image ID list described below. By this, the sharing of the currently-obtained original image with Read-app may be stopped.

On the other hand, when detecting a press of a return button 810 for returning to Read-app performed by the user in the storage completion screen illustrated in FIG. 8F, the CPU 201 starts a process in T528. In T528, the CPU 201 performs the process of generating an image ID list. Specifically, first, in Write-app, an image ID list is generated such that image IDs of the original images stored in T527 are associated with storage destinations, and thereafter, the image ID list which is readable by the OS is stored in the HDD 204. By this, Read-app may obtain the image ID list from the OS in T531 described below, read the original images based on the image ID list, and use the original images in the process of Read-app.

In T529, the CPU 201 transmits a request for activating Read-app by means of Write-app to the OS. Furthermore, the CPU 201 cancels the cooperation mode of Write-app at this timing and switches Write-app to be operated into the normal mode. Specifically, the CPU 201 cancels the restriction of usable functions, updates the restricted functions illustrate in FIG. 8A so that the restricted functions are selectable. In this way, Write-app returns to the normal mode.

In T530, the CPU 201 transmits a request for activating Read-app from the OS so as to activate Read-app. Furthermore, in the example of FIG. 5, since Read-app is operated in the background even after the process in T507 is performed, the CPU 201 switches the operation of Read-app into a foreground operation in a process in T530. Note that the CPU 201 may temporarily stop the operation of Read-app after the process in T507 and reactivate Read-app in response to the activation request issued in T530.

In T531, the CPU 201 receives the image ID list generated by Write-app in T528 through the OS from Read-app.

The CPU 201 reads the original images from the HDD 204 based on the image ID list from Read-app and adds the original images in a list display screen of Read-app to be displayed. For example, when "Add photos from Write-app" is selected in the screen illustrated in FIG. 7B and Write-app is cooperatively operated, the original images obtained from the imaging apparatus 102 by Write-app are added and displayed as new images in an image list display region 701.

As described above, according to this embodiment, when Write-app cooperated with Read-app obtains an original image having a format which is not supported by Read-app from the imaging apparatus 102, the storage process is not performed by Write-app.

For example, when Write-app displays a list of the thumbnail images corresponding to the original images of formats which are not supported by Read-app included in the imaging apparatus 102, information indicating whether the thumbnail images correspond to the original images which are not supported by Read-app is displayed.

By this, when Write-app is activated so that Read-app obtains the original images from the imaging apparatus 102 to be subjected to the image editing process, the original images which are not required to be subjected to the editing process are not obtained in vain, and therefore, wasted communication traffics may be avoided. Furthermore, the original images which are not supported by Read-app are clearly recognized in the list screen of the thumbnail images of Write-app, and therefore, the user do not select undesired images and usability is improved.

Second Embodiment

Processing Procedure of Communication Device

Next, a procedure of a process performed by the communication device 101 according to a second embodiment will be described with reference to FIGS. 9A to 10B, and FIGS. 11A and 11B. In this embodiment, a process of activating Read-app, receiving an instruction issued by a user in a screen for performing a process of Read-app, and calling Write-app which is performed by the CPU 201 of the communication device 101 will be described. Descriptions of configurations the same as those of the first embodiment are omitted, and configurations unique to this embodiment will be described in detail.

Figure 9A:
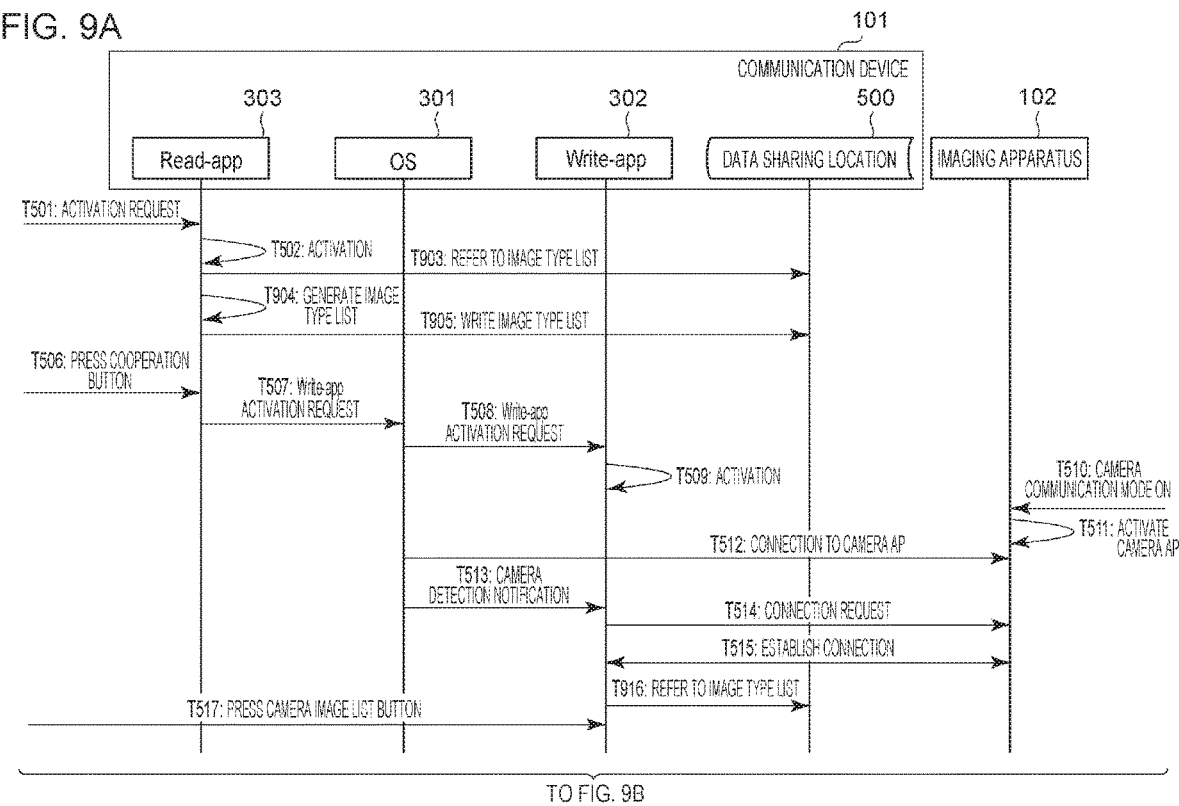
FIGS. 9A and 9B are a diagram illustrating an example of a sequence of a process of activating Write-app by means of Read-app, obtaining an image included in a camera by Write-app, and supplying the image to Read-app according to an embodiment of the present disclosure.
Figure 9B:
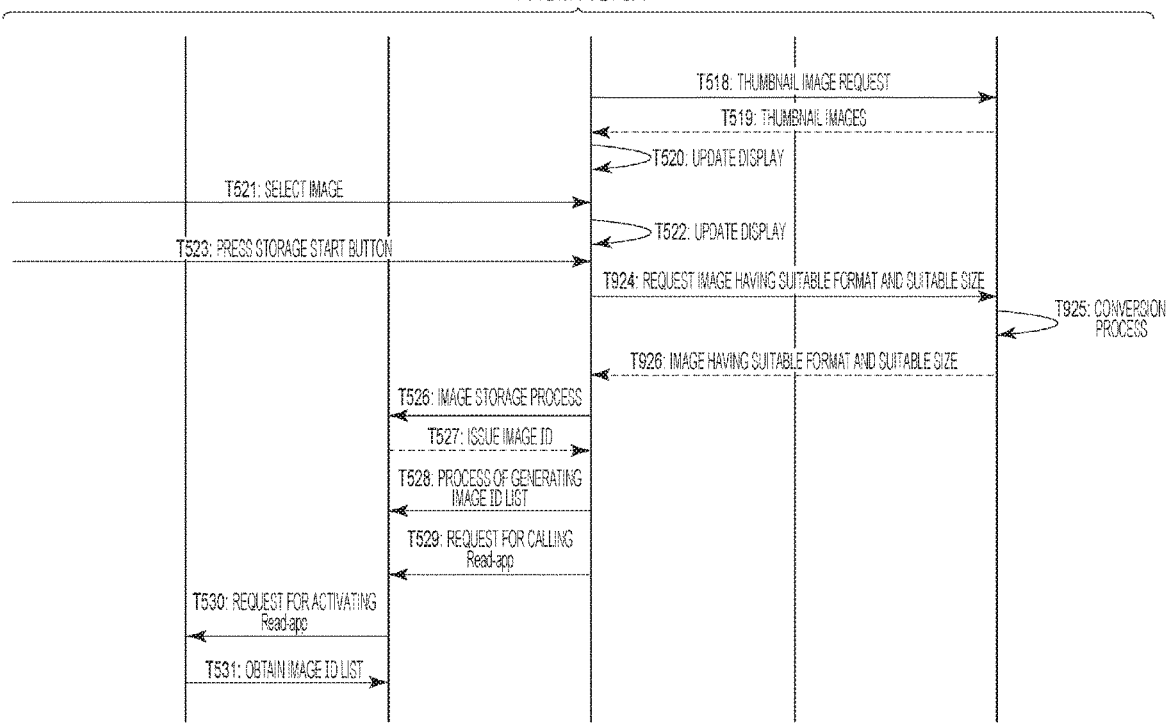

FIGS. 9A and 9B are a sequence diagram of a procedure of a process of activating Write-app after activating Read-app, obtaining an image from an external apparatus, and supplies the image obtained for an image editing process to Read-app which is performed by the CPU 201 of the communication device 101. Note that the process described below is realized when the CPU 201 of the communication device 101 activates the OS 301, Write-app 302, and Read-app 303, operates in accordance with the OS 301, Write-app 302, and Read-app 303 where appropriate, and controls the various units. A number of processes in FIGS. 9A and 9B are the same as those in FIG. 5, and therefore, reference numerals the same as those in FIG. 5 are assigned to the same processes and descriptions thereof are omitted.

Note that, for simplicity of description, a period in T501, T502, T903 to T905, and T506 to T509 is determined as a cooperation start phase, a period in T510 to T515 and T916 is determined as a connection phase, a period in T517 to T523, T924 to T926, T526, and T527 is determined as an image storage phase, and a period from T528 to T531 is determined as a cooperation termination phase.

First, the cooperation start phase will be described. After executing a process in T501 and T502, the CPU 201 determines whether a list having a combination of a data format and a size which is suitable for a process of Read-app (hereinafter referred to as an image type list) is included in a data sharing location 500 in T903 of FIG. 9A. When the determination is affirmative, the CPU 201 compares an image type list of Read-app stored in the data sharing location 500 with information indicating a data format and a size suitable for a process set in Read-app so as to determine a change has been made. Note that the information indicating a data format and a size set in Read-app is stored in the HDD 204 when Read-app is installed, and alternatively, is externally received through the Internet or the like when version-up of Read-app is performed so that the information is updated. Note that the settings of the suitable data format and the suitable size may be changed in Read-app so that an intention of a user is reflected.

The data sharing location 500 and the image type list will now be described in detail.

Figures 10A, 10B:
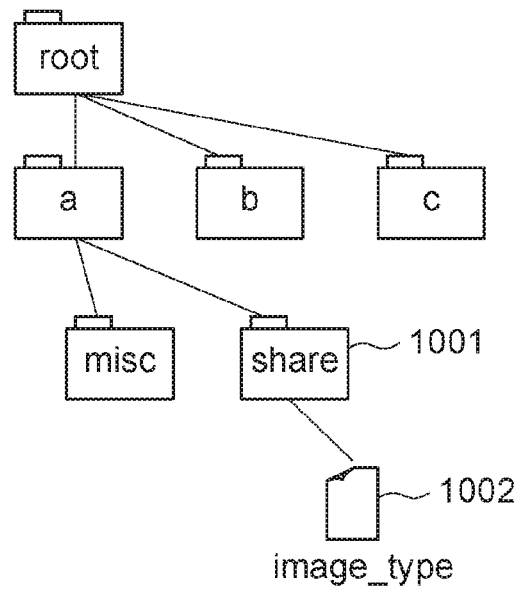
FIGS. 10A and 10B are diagrams illustrating examples of a data sharing location and a configuration of a data list according to an embodiment of the present disclosure.

First, the data sharing location 500 which is a predetermined storage region readable and writable by various applications will be described with reference to FIG. 10A. FIG. 10A is a diagram illustrating an example of a directory configuration of the HDD 204. In FIG. 10A, a reference numeral 1001 denotes a data sharing location folder. In this embodiment, an image type list 1002 of various cooperation applications including Read-app and Write-app is written below the data sharing location folder 1001. The data sharing location folder 1001 and the image type list 1002 are readable and writable by the cooperation applications including Read-app and Write-app. The various cooperation applications store a file path of the image type list 1002 ("/root/a/share/image_type" in the example of FIG. 10A). When being activated, the cooperation applications refer to a file of the image type list 1002 in a file path destination. Thereafter, the file of the image type list 1002 is compared with a format of a latest supported data format and a latest size set in the cooperation applications. When a difference is detected, it is determined that a change has been made.

The data sharing location 500 according to this embodiment has been described hereinabove.

Next, the image type list will be described with reference to FIG. 10B. FIG. 10B is a diagram illustrating an example of the image type list 1002. The image type list includes an application ID 1051, an array 1052 of a combination of a suitable data format and a suitable size, and an application name 1056. The application ID 1051 is unique to an application recorded in the HDD 204 when the application is installed in the communication device 101. The application name 1056 is a character string indicating a name of an application. In the image type list, a data format and a size which are suitable for an application are represented as a combination. For example, large-size RAW and small-size JPEG are combinations of a data format and a size suitable for an application 1053 having an application ID of 0x41. Here, in this embodiment, Large (a large size), Small (a small size), or Anything (any size) is specified as a size as illustrated in FIG. 10B. The image type list has been described hereinabove.

Note that, although the case where the image type list indicates combinations of data formats and sizes supported by individual applications (such as Read-app) is illustrated in this embodiment, combinations of data formats and sizes which are not supported by individual applications may be indicated. For example, a combination of a data format and a size which are not supported by any of the applications may be listed as an unsuitable image type.

Furthermore, although one of values in three steps (Large, Small, and Anything) is set according to this embodiment, a pixel size or a length of a side in a vertical direction or a horizontal direction may be specified by a specific numerical value.

Furthermore, when operating in accordance with Read-app, the communication device 101 does not process or read data which does not satisfy a condition indicated by an image type among data stored in the HDD 204. Furthermore, when receiving an instruction for processing the data which does not satisfy the condition indicated by the image type stored in the HDD 204, the CPU 201 may display a message indicating an alert in the display apparatus 211.

The description now returns to the sequence illustrated in FIGS. 9A and 9B.

When it is determined that the image type list 1002 of Read-app is not included in the data sharing location 500 or the image type list 1002 is included but is modified in T903, the operations in T904 and T905 are executed.

In T904, the CPU 201 generates an image type list based on a combination of the suitable data format and the suitable size set in Read-app. In T905, the image type list generated in T904 is written in the data sharing location 500 after being associated with a unique ID of Read-app.

In this case, when it is determined that the image type list 1002 of Read-app is not included in the data sharing location 500 in T903, the list generated in T904 is written after being associated with the unique ID of Read-app. On the other hand, when it is determined that the image type list 1002 is included in the data sharing location 500 and a modification has been made in T903, an existing image type list associated with the unique ID of Read-app is replaced by the image type list generated in T904.

Thereafter, a process from T506 to T509 is performed. The cooperation start phase has been described hereinabove.

Second, the connection phase will be described.

The CPU 201 performs a process from T510 to T515. In T916, the CPU 201 reads the application ID of Read-app obtained in T508 from the RAM 203 and refers to the image type list stored in the data sharing location 500 based on the application ID. The CPU 201 obtains a combination of a suitable data format and a suitable size (hereinafter referred to as an image type where appropriate) corresponding to Read-app from the image type list and stores the combination in the RAM 203.

The connection phase has been described hereinabove. Although the case where the process in T916 is performed when the connection to the imaging apparatus 102 is completed has been described, the present disclosure is not limited to this. The process in T916 may be performed when Write-app is activated or when rendering update is performed in T520 described below.

Third, the image storage phase will be described.

The CPU 201 performs a process in T517 and T518. In T519, the CPU 201 receives thumbnail images and information indicating supported data formats of the original images corresponding to the individual thumbnail images from the imaging apparatus 102 through the NET I/F 209 and stores the thumbnail images and the information in the HDD 204. For example, even if a thumbnail image is a JPEG format, when a data format of a corresponding original image is a RAW format, a controller 401 of the imaging apparatus 102 may transmit data of the RAW format corresponding to the original image to the communication device 101 as it is. Alternatively, the original image may be converted into the JPEG format from the RAW format and transmitted to the communication device 101. In this case, the controller 401 may transmit the RAW format and the JPEG format to the communication device 101 as data formats which may be provided by the original image. Although a description will be made provided that the imaging apparatus 102 may perform size conversion irrespective of a data format of an original image in this embodiment, the present disclosure is not limited to this. For example, the imaging apparatus 102 may transmit information on a size which may be provided by the original image to the communication device 101. In this case, a combination of the data format and a size which may be provided by the original image may be transmitted to the communication device 101.

In T520, the thumbnail images stored in the HDD 204 are read and displayed in the display apparatus 211. Here, a UI illustrated in FIG. 8B is displayed in Write-app.

Note that the process from T518 to T520 is repeatedly executed on the thumbnail images displayed in a rendering region of the display apparatus 211. Specifically, every time a display range is scrolled in a vertical direction to change a position of the display range by the user, the process from T518 to T520 is repeatedly performed on the thumbnail images which are newly rendered.

In T521, the CPU 201 detects a press, by the user, of a selection button 804 illustrated in FIG. 8B.

In T522, the CPU 201 brings Write-app into a selection mode and updates the display on the screen. In this case, a thumbnail image list screen listing the plurality of thumbnail images is displayed in Write-app as illustrated in FIG. 8C.

Note that, in a case where the imaging apparatus 102 may not provide an image of a data format suitable for Read-app from an original image, a corresponding thumbnail image may be displayed in a distinguishable manner. Here, the CPU 201 compares data formats provided by the original images corresponding to the thumbnail images received in T519 with data formats in the image type list of Read-app stored in the RAM 203 in T916. As a result of the comparison, the CPU 201 controls display such that a slash 805 is superposed on thumbnail images corresponding to original images which may not be provided by the data formats suitable for Read-app as illustrated in FIG. 8C. By this, the individual thumbnail images are displayed such that it is recognized that the data formats of the original images corresponding to the thumbnail images are supported by Read-app or not supported by Read-app.

When the user selects one of the thumbnail images corresponding the slash 805 superposed thereon, the CPU 201 displays an alert dialog 808 indicating that the selected image is not supported by Read-app as illustrated in FIG. 8D. Information on the selected thumbnail image is not added to a storage candidate image list.

On the other hand, when the user selects one of the thumbnail images corresponding to the original images provided in the data formats suitable for Read-app, the CPU 201 displays a check mark 806 indicating that an image is being selected on the thumbnail images as illustrated in FIG. 8C. Then the CPU 201 compares the data formats in the image type list of Read-app stored in the RAM 203 in T916 with the data formats provided by the original images corresponding to the thumbnail images received in T519 so as to determine a data format and a size for storage. The CPU 201 adds information on the selected thumbnail image and the data format and the size (an image type) to be stored which are associated with one another to the storage candidate image list and stores the information, the data format, and the size in the RAM 203 in a state in which the information, the data format, and the size may be read from Write-app.

Assuming that Read-app is the application 1053 of FIG. 10B, when a thumbnail image corresponding to an original image which provides a JPEG format is selected, the CPU 201 determines that a "Small" size and the JPEG format are employed for storage, associates the JPEG format and the Small size with information on the thumbnail image, and adds the image in the storage candidate image list.

Figure 11A:
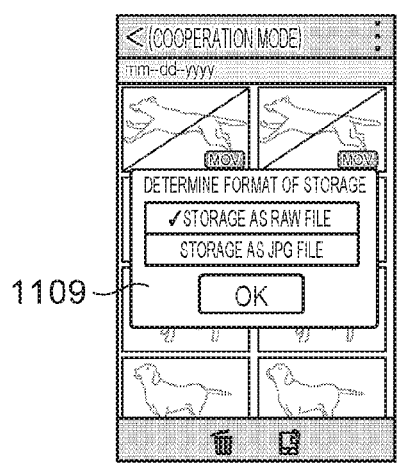
FIGS. 11A and 11B are diagrams illustrating examples of a display screen of Write-app according to an embodiment of the present disclosure.

Here, in a case where the imaging apparatus 102 may provide images of a plurality of data formats suitable for Read-app from the original images when the user selects a thumbnail image, the user may select one of the data formats. Here, the CPU 201 compares data formats provided by the original images corresponding to the thumbnail images received in T519 with the data formats in the image type list of Read-app stored in the RAM 203 in T916. As a result of the comparison, when images may be stored in the plurality of data formats suitable for Read-app, a format selection dialog 1109 is displayed as illustrated in FIG. 11A so that the user may select one of the data formats to be used for storage.

When Read-app is the application 1053 of FIG. 10B, for example, the RAW format and the JPEG format are the data formats suitable for Read-app. On the other hand, when a thumbnail image corresponding to an original image of the RAW format is selected in Write-app, the imaging apparatus 102 may supply image data of the RAW format or the JPEG format. The CPU 201 displays the format selection dialog 1109 illustrated in FIG. 11A. When the data format for storing the original image is determined in the format selection dialog 1109, the CPU 201 compares the data formats in the image type list of Read-app with the determined data format so as to determine an image type to be stored. The CPU 201 adds information on the selected thumbnail image and the image type to be stored which are associated with one another to a storage candidate image list and stores the information and the image type in the RAM 203 in a state in which the information and the image type are readable from Write-app.

Figure 11B:
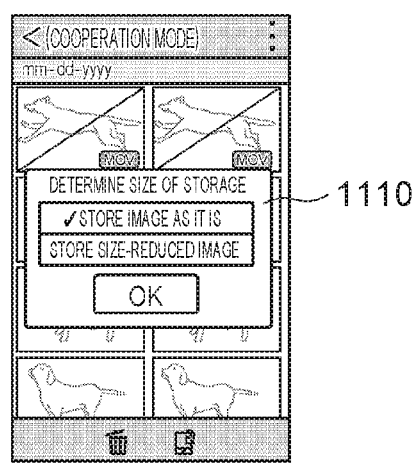

Similarly, in a case where, when a thumbnail image is selected by the user, an original image may be provided in the data format suitable for Read-app and Read-app permits a plurality of sizes in the data format, the user may select one of the sizes. Here, the CPU 201 compares data formats provided by the original images corresponding to the thumbnail images received in T916 with the data formats in the image type list of Read-app stored in the RAM 203 in T916. When it is determined that the original image may be provided in the data format suitable for Read-app as a result of the comparison, a size corresponding to the data format is checked in the image type list. When it is determined that a plurality of sizes are permitted, a size selection dialog 1110 which causes the user to select one of the sizes for storage is displayed as illustrated in FIG. 11B.

Assuming that Read-app is an application 1055 of an application ID of 0x9F of FIG. 10B, for example, an image suitable for Read-app has the JPEG format and a size of Anything (any size). When a thumbnail image corresponding to an original image of the JPEG format is selected in Write-app, the CPU 201 displays the size selection dialog 1110 illustrated in FIG. 11B.

When the user determines a size of the image to be stored in the size selection dialog 1110, the CPU 201 adds information on the selected thumbnail image and the image type to be stored which are associated with each other in the storage candidate image list and stores the information and the image type in the RAM 203 in a state in which the information and the image type are readable from Write-app. Note that, although the format selection dialog 1109 illustrated in FIG. 11A and the size selection dialog 1110 illustrated in FIG. 11B are independently displayed, a data format and a size may be selected in one screen.

When detecting a press of a storage start button 807 illustrated in FIG. 8C performed by the user in T523, the CPU 201 transmits a data request for transmitting original images which satisfy a condition of the suitable data format and the suitable size based on the storage candidate image list stored in the RAM 203 to the imaging apparatus 102 through the NET I/F 209 in T924.

Furthermore, the CPU 201 switches the screen illustrated in FIG. 8C to a screen illustrated in FIG. 8E.

In T925, the imaging apparatus 102 performs a conversion process on the original image where appropriate. When an image of a JPEG format is requested in T924 although the original image has the RAW format, the imaging apparatus 102 extracts the JPEG image from an image file of the original image of the RAW format and performs a process of obtaining the image file including the JPEG image. Furthermore, when a JPEG image of a specific Small size is requested in T924, for example, the imaging apparatus 102 performs a process of resizing the extracted JPEG image into a JPEG image of a specific Small size (a size within a range of 640×480, for example).

In T926, the CPU 201 receives an image of the suitable data format and the suitable size requested in T924 from the imaging apparatus 102 through the NET I/F 209. Note that the thumbnail images have resolution lower than that of the original images or images having data formats and sizes which may be provided by the images, and therefore, data sizes of the thumbnail images are small. Therefore, when "List of Images in Camera" is to be displayed, the thumbnail images are received from the imaging apparatus 102 and are quickly displayed in the display apparatus 211. When an image of the suitable data format and the suitable size which is larger than the thumbnail image is to be obtained from the imaging apparatus 102, a request for transmitting the data format and the size, which are suitable for Read-app, of only an original image corresponding to the thumbnail image selected by the user is transmitted. By this, only a required original image or only an image of a data format and a size which are suitable for Read-app may be received, and therefore, a communication load may be reduced.

When the image of the data format and the size which are suitable for Read-app has been received, the CPU 201 performs a process of storing the image in Write-app in T526. Specifically, the CPU 201 stores a file of the image of the suitable data format and the suitable size received in T526 in the HDD 204, and assigns an image ID to the image which is newly stored in step T527.

Note that the process from the request for obtaining the image of the suitable data format and the suitable size performed in T924, the original image conversion process performed in T925, the image reception process performed in T926, the image storage process performed in T526, to the process of issuing the image ID corresponding to the image of the suitable data format and the suitable size performed in T527 is repeatedly performed a number of times corresponding to the number of thumbnail images selected by the user. While the series of operations of the image storage process is performed, the CPU 201 displays a storage progress screen illustrated in FIG. 8E in the display apparatus 211.

The image storage phase has been described hereinabove. Although the case where a predetermined mark, such as a slash, is displayed in the vicinity of a thumbnail image of an original image which is not provided by the imaging apparatus 102 in a data format suitable for Read-app in T522 is illustrated in this embodiment, the present disclosure is not limited to this. For example, in a thumbnail list screen in a selection mode, thumbnail images corresponding to original images which may not be provided in a suitable data format may not be displayed. Alternatively, the mark may be displayed in the vicinity of a thumbnail image of an original image of a data format supported by Read-app.

Subsequently, the CPU 201 performs the cooperation termination phase from T528 to T531.

As described above, according to this embodiment, when Write-app cooperated with Read-app obtains an image from the imaging apparatus 102, an original image of a data format and a size which are suitable for Read-app is received and stored.

For example, when Write-app displays a list of thumbnail images corresponding to original images of data formats which are not suitable for Read-app included in the imaging apparatus 102, information indicating whether the thumbnail images correspond to the original images which are not supported by Read-app is displayed.

Although suitable data formats and suitable data sizes may be different among applications installed in the communication device 101, an application of a cooperation destination (Write-app) may obtain data of a data format and a size which are suitable for an application of a cooperation source (Read-app) from an external apparatus (an imaging apparatus) according to the present disclosure.

By this, when Write-app is activated so that Read-app obtains original images to be subjected to the image editing process from the imaging apparatus 102, the original images which are not required to be subjected to the editing process are not obtained since only original images which are converted so as to satisfy conditions of an appropriate data format and an appropriate size indicated by image type information are obtained, and therefore, wasted communication traffics may be avoided. Furthermore, the original images which are not supported by Read-app are clearly recognized in the list screen of the thumbnail images of Write-app, and therefore, the user do not select inappropriate images and usability is improved.

Although the process of resizing an original image is performed by the imaging apparatus 102 in this embodiment, the present disclosure is not limited to this. For example, after an original image which has not been subjected to the resizing process is received from the imaging apparatus 102, the CPU 201 may resize the original image in a size suitable for Read-app in a process performed by Write-app. Accordingly, an image of a size suitable for Read-app may be stored irrespective of capability of the imaging apparatus 102. Furthermore, if an original image may not be resized in a size suitable for Read-app after information indicating whether the resizing process is available is received from the imaging apparatus 102, a thumbnail image corresponding to the original image may be displayed in Write-app in a distinguishable manner.

Alternatively, in the image type list described with reference to FIG. 10B in this embodiment, priority levels may be assigned to individual items of the array 1052 included in the image type list and stored. For example, an image type arranged in a higher order in the array 1052 may have a high priority level. In this case, it is interpreted that although the application 1053 most preferably obtains images in the RAW format of a large size, the application 1053 also supports the JPEG format of a small size. Furthermore, it is interpreted that an application 1054 having an application ID of 0x53 most preferably obtain an image of the JPEG format and a small size followed by an image of the JPEG format and a large size, an image of a TIFF format and a small size. Since the priority levels are assigned in the image type list, an original image of a more suitable data format and a more suitable size may be stored and image data may be provided for an application. Furthermore, since a data format and a size are automatically determined in accordance with a priority level, a load of a manual operation by the user using the format selection dialog 1109 and the size selection dialog 1110 illustrated in FIGS. 11A and 11B may be reduced.

Furthermore, although the case where a data format and a size which are suitable for Read-app are determined is described in this embodiment, only one of the data format and the size may be determined and an original image which is converted so as to satisfy the determined condition may be received from an imaging apparatus.

Moreover, the case where the imaging apparatus 102 converts an original image so that the original image satisfies a condition indicated by an image type is described in this embodiment. However, the present disclosure is not limited to this, and the imaging apparatus 102 may transmit the original image to the communication device 101 without converting the original image. The communication device 101 may operate in accordance with Write-app and convert an original image so that the original image satisfies a condition indicated by an image type. In this case, the original image readable by Read-app may be stored in the HDD 204. Here, the imaging apparatus 102 may not transmit an original image which may not be converted so as to satisfy the condition indicated by the image type to the imaging apparatus 102. By this, an original image which may not be processed by Read-app is not transmitted from the imaging apparatus 102 to the communication device 101 and a transmission process is not performed in vain.

Third Embodiment

In the second embodiment, the case where Read-app activates Write-app and Write-app activates Read-app as a response is described. However, the present disclosure is not limited to this. For example, in Write-app, Read-app may be selected and activated in response to an activation instruction issued by a user. In this case, the CPU 201 checks an image type list in a sharing location and obtains and supplies an image of a data format and a size which are suitable for Read-app instructed to be activated from the imaging apparatus 102. Hereinafter, a flow of the process will be described with reference to FIGS. 12A and 12B.

Figure 12A:
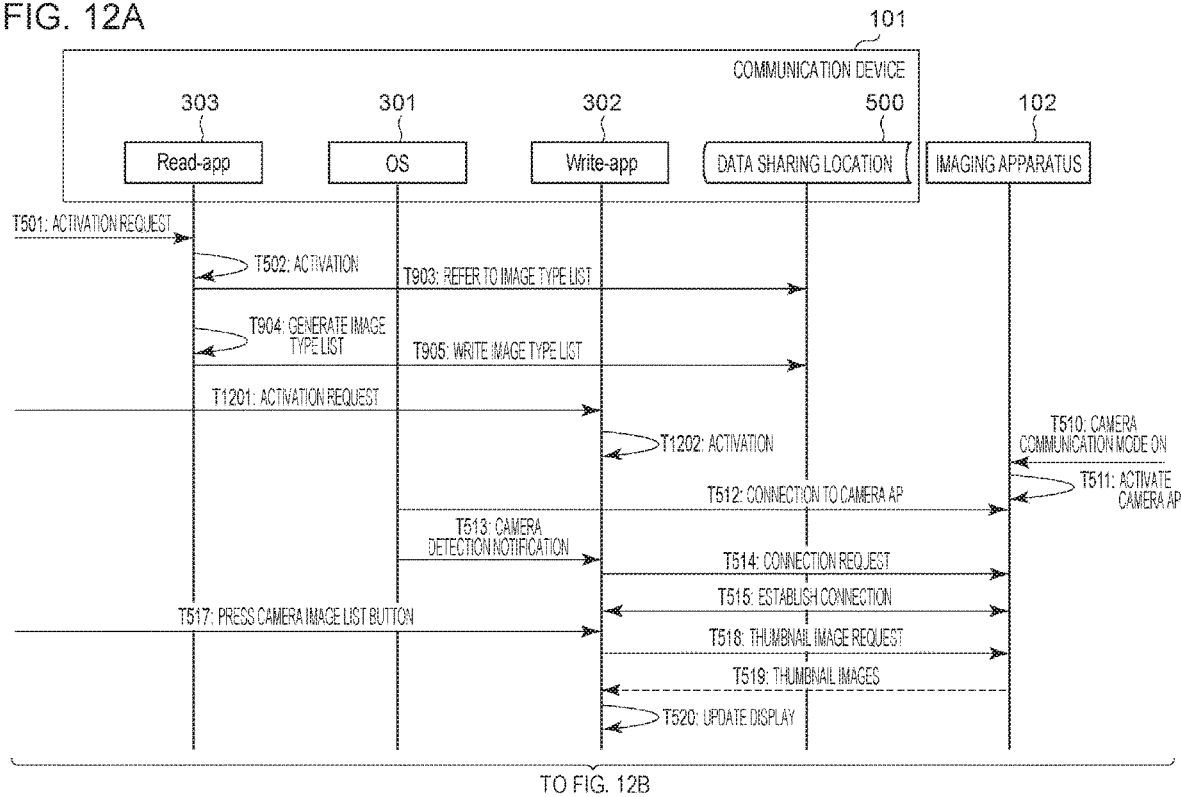
FIGS. 12A and 12B are a diagram illustrating an example of a sequence of a process of activating Write-app, determining Read-app, obtaining an image included in a camera by Write-app, and supplying the image to Read-app according to an embodiment of the present disclosure.
Figure 12B:
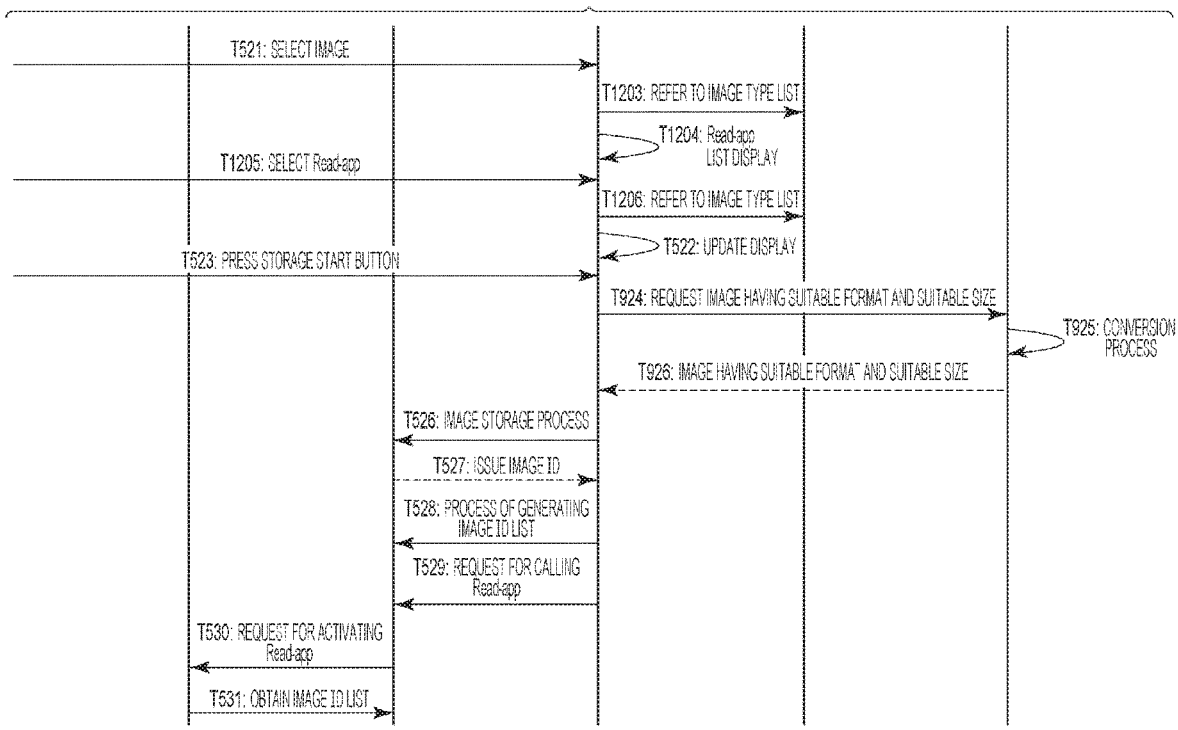

FIGS. 12A and 12B are a sequence diagram of a procedure of a process of activating Write-app, determining Read-app serving as a cooperation destination in accordance with an instruction issued by a user, obtaining an image from an external apparatus, and supplying the obtained image to Read-app which is performed by the CPU 201 of a communication device 101. Note that, the process described below is realized when a CPU 201 of the communication device 101 activates an OS 301, Write-app 302, and Read-app 303, operates in accordance with the OS 301, Write-app 302, and Read-app 303, and controls the various units. A number of processes in FIGS. 12A and 12B are the same as those in FIG. 5 and FIGS. 9A and 9B, and therefore, reference numerals the same as those in FIG. 5 and FIGS. 9A and 9B are assigned to the same processes and descriptions thereof are omitted.

Note that, for simplicity of description, a period from T501 to T1202 (including T502, T903 to T905, and T1201) is determined as a cooperation preparation phase, a period from T510 to T515 is determined as a connection phase, a period from T517 to T527 (including T521, T1203 to T1206, T522, T523, T924 to T926, and T526) is determined as an image storage phase, and a period from T528 to T531 is determined as a cooperation termination phase.

First, the cooperation preparation phase will be described. When the process in T501, T502, and T903 to T905 is executed by the CPU 201, an image type list of Read-app is installed in a data sharing location. Note that the process in T501, T502, and T903 to T905 is executed at least once before activation of Write-app, and is not to be executed every time Write-app is activated.

In T1201, the CPU 201 receives a request for activating Write-app in accordance with a user operation.

Subsequently, in T1202, a process is started when the CPU 201 activates Write-app in response to the activation request in T1201. Unlike T509, Write-app is not activated in response to a call from Write-app in T1202. Therefore, in T1202, the CPU 201 operates Write-app in a normal mode and displays a screen of Write-app illustrated in FIG. 13A. Specifically, in the screen illustrated in FIG. 13A, a status bar indicating a cooperation mode displayed in FIG. 8A is not displayed but UI display indicating that all functions are available is displayed.

Figure 13A:
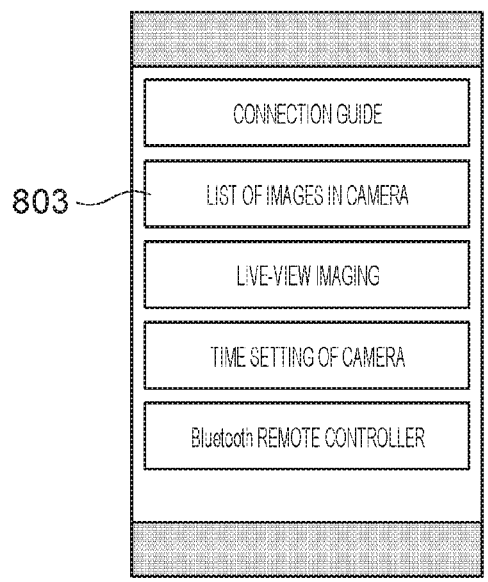
FIGS. 13A to 13C are diagrams illustrating examples of a display screen of Write-app according to an embodiment of the present disclosure.
Figure 13B:
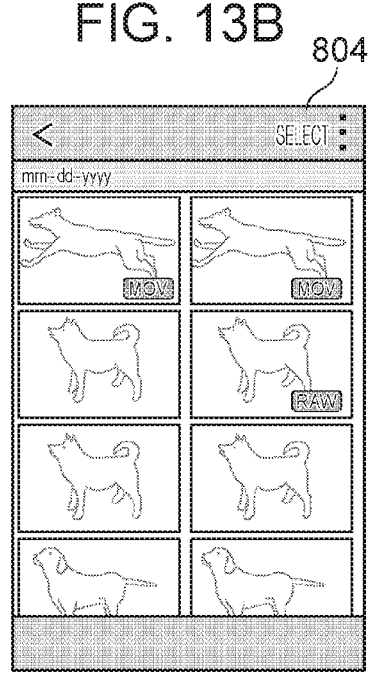
Figure 13C:
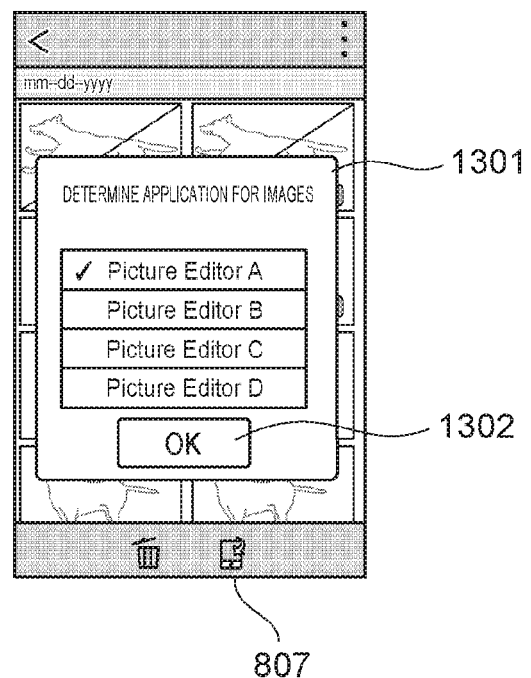

A number of portions in the screens in in FIGS. 13A to 13C are the same as those in FIGS. 8A to 8F, and therefore, reference numerals the same as those in FIGS. 8A to 8F are assigned to the same processes and descriptions thereof are omitted.

Subsequently, when the CPU 201 of the communication device 101 executes a process of the connection phase from T510 to T515, connection between an imaging apparatus 102 and the communication device 101 is established.

Next, the image storage phase will be described.

When detecting a press of an image list button 803 in a camera illustrated in FIG. 13A in T517, the CPU 201 performs a process from T518 to T520 described above and displays a list of thumbnail images in a rendering region of a display apparatus 211. By this, a UI illustrated in FIG. 13B is displayed in Write-app. Here, FIG. 13B is a diagram illustrating an example of display of a screen for displaying a thumbnail image list in a case where Write-app operates in the normal mode, and the status bar indicating the operation mode is not displayed.

In T521, the CPU 201 detects a press, by the user, of a selection button 804 illustrated in FIG. 13B.

In T1203, the CPU 201 obtains a list of application names to be stored in a RAM 203 with reference to an image type list stored in a data sharing location 500. In T1204, the application name list obtained in T1202 is read from the RAM 203, and an application selection dialog 1301 which prompts the user to select an application (that is, Read-app) to be used by supplying an image from Write-app is displayed as illustrated in FIG. 13C.

In T1205, the CPU 201 detects a press of an OK button 1302 after selection of an application name performed by the user in the application selection dialog 1301 illustrated in FIG. 13C.

In T1206, the CPU 201 determines Read-app based on the application name selected by the user in T1205. Thereafter, the CPU 201 obtains an image type suitable for Read-app with reference to the image type list stored in the data sharing location 500 and stores the image type in the RAM 203.

Subsequently, when the CPU 201 performs a process in T522, T523, T924 to T926, T526, and T527 as described above, an image selected by the user may be received from the imaging apparatus 102 in a data format and a size which are suitable for Read-app and stored in an HDD 204 in a communication device 101.

Thereafter, a process of the cooperation termination phase from T528 to T531 is performed, and the image stored by Write-app may be read from Read-app and edited.

As described above, according to this embodiment, when Write-app causes the user to select Read-app which uses an image and an image included in the imaging apparatus 102 is obtained, an image of a data format and a size which are suitable for Read-app is received and stored.

By this, when the user activates Write-app so as to view an image and desires to edit the image, an arbitrary application may be selected in Write-app and an image of a data format and a size suitable for the selected application may be obtained from the imaging apparatus 102. Specifically, when an original image is obtained from the imaging apparatus 102, an unrequired image which is not appropriate for an editing process is not obtained and an image of an appropriate data format is obtained after being converted in an appropriate size, and accordingly, wasted communication traffic may be avoided.

Fourth Embodiment

Hereinafter, a fourth embodiment of the present disclosure will be described with reference to the accompanying drawings. In this embodiment, a user operates a communication device so as to activate an application for obtaining data by means of an image editing application so that the applications are cooperated with each other, and data transmission performed by an imaging apparatus is performed based on a data formation supported by the image editing application. Note that the term "activation" of an application in this embodiment indicates a case where an inactivated application is activated and a case where an application operated in a background is brought into an active state by switching the application to a foreground.

System Configuration

Figure 14:
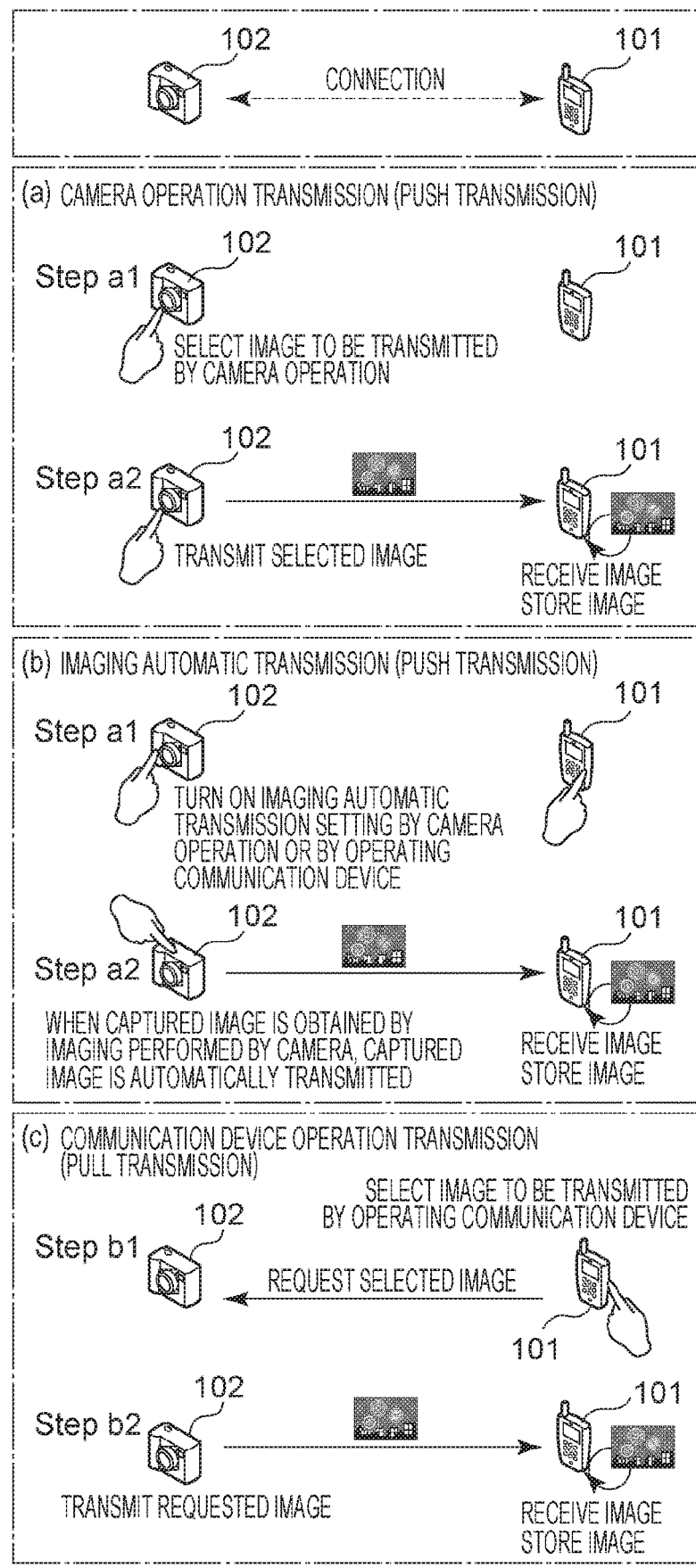
FIG. 14 is a diagram schematically illustrating a connection form between an imaging apparatus and a communication device and an image transmission method according to an embodiment of the present disclosure.

FIG. 14 is a diagram schematically illustrating a connection form between an imaging apparatus 102 and a communication device 101 and a method for transmitting an image from the imaging apparatus 102 to the communication device 101 according to this embodiment.

As the connection form, the imaging apparatus 102 and the communication device 101 may be added to a wireless local area network (LAN) formed by an external AP which is an example of an external relaying apparatus or the imaging apparatus 102 and the communication device 101 are directly connected to each other without using the external AP. In the case of the direct connection, the imaging apparatus 102 forms a wireless LAN by operating as a simple AP. In this case, when operating as a simple AP, the imaging apparatus 102 periodically transmits a beacon signal. The communication device 101 detects the beacon signal and is added to the wireless LAN network formed by the imaging apparatus 102. Thereafter, the communication device 101 and the imaging apparatus 102 find each other and obtain capabilities each other so that communication is established. In this way, data transmission and reception becomes available.

In this embodiment, three types of image transmission methods will be described. In (a) of FIG. 14, the user operates the imaging apparatus 102 so as to select an image to be transmitted from among images in the imaging apparatus 102 and instructs transmission of the selected image to the communication device 101. This operation is referred to as "camera operation transmission" and is a type of PUSH transmission according to this embodiment. In (b) of FIG. 14, the user turns ON an imaging automatic transmission setting of the imaging apparatus 102 by operating the imaging apparatus 102 or the communication device 101 so as to automatically transmit the image from the imaging apparatus 102 to the communication device 101 at a time of imaging. This operation is referred to as "imaging automatic transmission" and is a type of PUSH transmission according to this embodiment. In (c) of FIG. 14, the user operates the communication device 101 so as to obtain attribute information of an image stored in the imaging apparatus 102 and instructs the imaging apparatus 102 to transmit the image corresponding to the selected attribute information. This operation is referred to as "communication device operation transmission" and is a type of Pull image transmission according to this embodiment. The user selectively uses one of the three image transmission methods.

However, the image transmission methods are not simultaneously employed, that is, only one of the methods is employed. Here, the "camera operation transmission" in (a) of FIG. 14 is realized by operating only the imaging apparatus 102, and a screen used to prevent the communication device 101 from being operated while an operation of transmitting an image is performed using the imaging apparatus 102 is displayed in the communication device 101. Similarly, "imaging automatic transmission" in (b) of FIG. 14 is realized by operating only the imaging apparatus 102, and an image reception screen is displayed in the communication device 101 so that the communication device 101 is not operated while the imaging apparatus 102 performs imaging and automatically transmits a captured image. Furthermore, the "communication device operation transmission" in (c) of FIG. 14C is realized by operating only the communication device 101, and a screen used to prevent the imaging apparatus 102 from being operated is displayed in the imaging apparatus 102 while an operation of transmitting an image is performed using the communication device 101.

Furthermore, in this embodiment, the communication device 101 may have various functions in addition to the image transmission function. Examples of such a function include a "remote imaging function" of remotely controlling imaging performed by the connected imaging apparatus 102 by operating the communication device 101 and a "camera setting function" of remotely changing a time setting of a body of the imaging apparatus 102 by operating the communication device 101. However, the "camera operation transmission" is not executed while an operation is executed by such a communication device 101 and a screen indicating that the "camera operation transmission" is not executed is displayed in the imaging apparatus 102.

Processing Procedure of Communication Device

Next, a procedure of a process performed by the communication device 101 according to this embodiment will be described with reference to FIGS. 15 to 16D. In this embodiment, when the CPU 201 of the communication device 101 activates Write-app by means of Read-app and Write-app and Read-app cooperate with each other, the CPU 201 performs control of data transmission to the imaging apparatus 102 in accordance with a data format supported by Read-app.

Figure 15B:
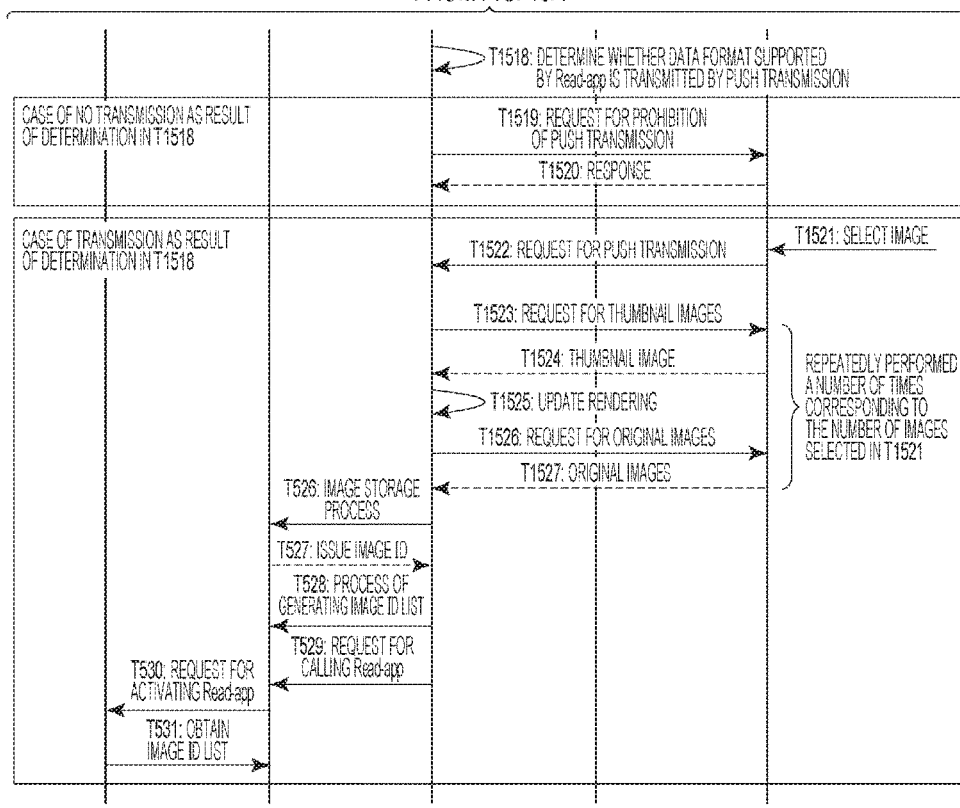

FIG. 15 is a sequence diagram illustrating a processing procedure according to this embodiment. Note that, the process described below is realized when the CPU 201 of the communication device 101 activates the OS 301, Write-app 302, and Read-app 303, operates in accordance with the OS 301, Write-app 302, and Read-app 303, and controls the various units.

Note that, for simplicity of description, a period from T501 to T509 is determined as a cooperation start phase, a period from T510 to T515 and T1516 to T1520 is determined as a connection phase, a period from T1521 to T1527, T526, and T527 is determined as an image storage phase, and a period from T528 to T531 is determined as a cooperation termination phase.

First, the CPU 201 executes a process from T501 to T509 in the cooperation start phase followed by a process from T510 to T515 in a connection start phase. By this, connection between the imaging apparatus 102 and the communication device 101 is established.

In T1516, the CPU 201 determines whether Write-app has been cooperated with Read-app. When the determination is negative, the process from T1517 to T1518 is not performed.

When the determination is affirmative, the CPU 201 reads an application ID of Read-app obtained in T508 from a RAM 203 and refers to a format list stored in a data sharing location 500 based on the application ID in T1517. The CPU 201 obtains a supported data format corresponding to Read-app from the format list and stores the data format in the RAM 203.

In T1518, the CPU 201 determines whether a data format which is not used in the PUSH transmission by the imaging apparatus 102 (a RAW format, for example, in this embodiment) is included in data formats supported by Read-app obtained in T1517. When the determination is affirmative, the CPU 201 proceeds to T1519. On the other hand, when the determination is negative, the CPU 201 proceeds to T1521. Note that the data format which is not used in the PUSH transmission by the imaging apparatus 102 is stored in the RAM 203 in advance in a state in which the data format is readable from Write-app. Alternatively, a data format to be used in the PUSH transmission by the imaging apparatus 102 may be stored in the RAM 203 in advance in a state in which the data format is readable from Write-app. Then it may be determined, in T1518, whether data formats other than the data format to be transmitted in the PUSH transmission by the imaging apparatus 102 are included in the data formats supported by Read-app.

When the RAW format is included in the data formats supported by Read-app, the CPU 201 transmits a request for prohibiting the PUSH transmission (the camera operation transmission and the imaging automatic transmission in this embodiment) through the NET I/F 209 in T1519. When receiving the prohibition request from the communication device 101, a controller 401 of the imaging apparatus 102 does not accept an operation for performing the PUSH transmission or displays a dialog indicating that the operation for performing the PUSH transmission is not accepted in the display unit 406. In this way, the controller 401 of the imaging apparatus 102 prohibits transmission of an image included in the imaging apparatus 102 to the communication device 101 by the PUSH transmission.

In T1520, the CPU 201 receives a response from the imaging apparatus 102 through a NET I/F 209. Note that if the process in T1519 and T1520 is performed, the CPU 201 does not perform the subsequent process.

Figure 16A:
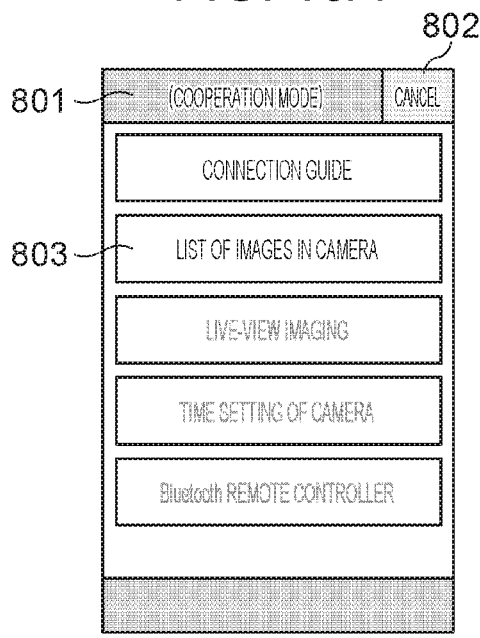
FIGS. 16A to 16D are diagrams illustrating examples of a display screen of Write-app according to an embodiment of the present disclosure.

When the user presses a cancel button 802 illustrated in FIG. 16A after this operation, the CPU 201 transmits a request for cancelling the prohibition of the PUSH transmission to the imaging apparatus 102. When receiving the prohibition cancellation request from the communication device 101, the controller 401 of the imaging apparatus 102 restarts a reception of an operation for performing the PUSH transmission so as to transmit an image included in the imaging apparatus 102 to the communication device 101 by the PUSH transmission. Note that a screen illustrated in FIG. 16A is the same as that illustrated in FIG. 8A.

The connection phase has been described hereinabove. Although the case where the process in T1517 is performed when the connection to the imaging apparatus 102 is completed has been described, the present disclosure is not limited to this. The process in T1517 may be performed when Write-app is activated in T509.

Third, the image storage phase will be described.

In T1521, the user operates the imaging apparatus 102 so as to select an image to be transmitted from among the images included in the imaging apparatus 102 and instructs the PUSH transmission. The imaging apparatus 102 transmits a request for performing the PUSH transmission to the communication device 101 in response to an instruction issued by the user.

In T1522, the CPU 201 receives a PUSH transmission request from the imaging apparatus 102 through the NET I/F 209. The PUSH transmission request includes list information indicating the original image selected by the user using the imaging apparatus 102 in T1521. The CPU 201 stores the list information in the RAM 203 as a storage candidate image list in a state in which the list information is readable from Write-app.

When receiving the PUSH transmission request from the imaging apparatus 102, the CPU 201 transmits a request for obtaining attribute information corresponding to a captured image (an original image) based on the storage candidate image list stored in the RAM 203 to the imaging apparatus 102 through the NET I/F 209 in T1523. Although a case where the attribute information is a thumbnail image will be described in this embodiment, the present disclosure is not limited to this and the attribute information may be a file name, for example.

In T1524, the CPU 201 receives thumbnail images and information indicating data formats of the original images corresponding to the individual thumbnail images from the imaging apparatus 102 through the NET I/F 209 and stores the information and the information in the HDD 204.

Figure 16B:
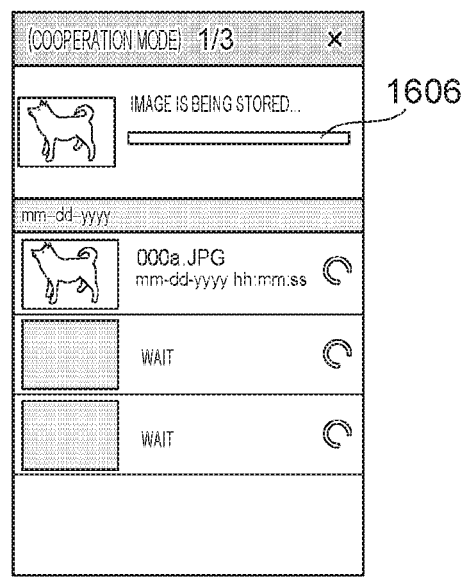
Figure 16C:
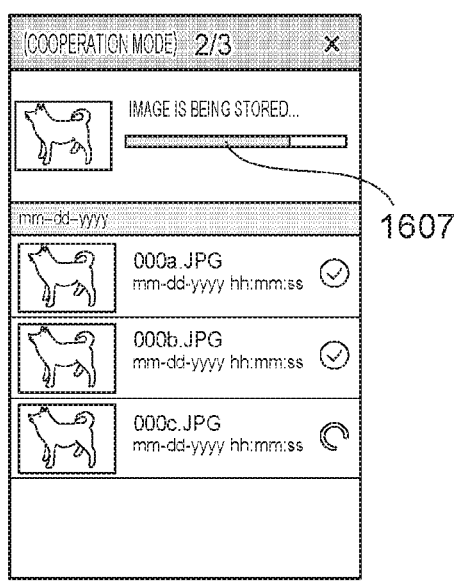

In T1525, the thumbnail images stored in the HDD 204 are read and displayed in the display apparatus 211. Here, a GUI illustrated in FIG. 16B is displayed in Write-app. FIG. 16B is a diagram illustrating a state in which, every time a thumbnail image is read, the thumbnail image is successively added to a screen and displayed in the display apparatus 211. An original image corresponding to the thumbnail image has not been received from the imaging apparatus 102, and therefore, a progress bar 1606 indicates 0%.

In T1526, the CPU 201 transmits a request for obtaining the original image based on the storage candidate image list stored in the RAM 203 to the imaging apparatus 102 through the NET I/F 209 in T1522.

In T1527, the CPU 201 receives the original image based on the storage candidate image list received in T1522 from the imaging apparatus 102 through the NET I/F 209. Here, the CPU 201 switches the screen illustrated in FIG. 16B to a screen illustrated in FIG. 16C. Then a progress bar 1607 is displayed while being updated in accordance with progress of the reception of the original image from the imaging apparatus 102. The thumbnail images have resolution lower than that of the original images, and therefore, data sizes of the thumbnail images are small. When an original image having a data size larger than that of a thumbnail image is obtained from the imaging apparatus 102, only an original image which has a format supported by Read-app and which is selected by the user using the imaging apparatus 102 is received. By this, reception of wasted data which may not be processed in Read-app is suppressed, and therefore, a communication load may be reduced.

Then the CPU 201 performs a process from T526 to T527. The image storage phase has been described hereinabove.

Figure 16D:
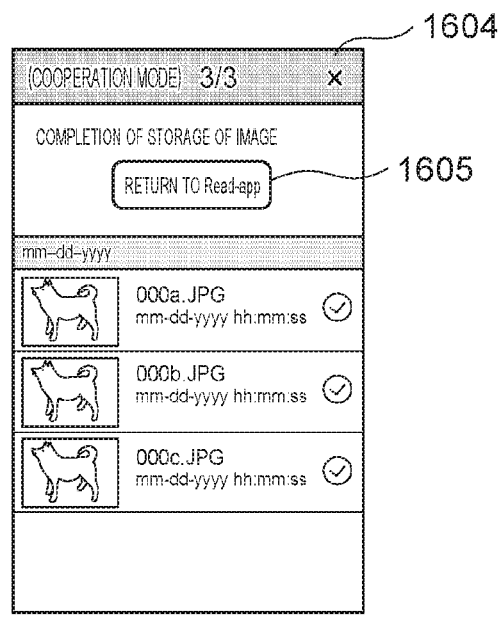

When executing the process described above and terminating a process of storing all original images corresponding to the storage candidate image list stored in the RAM 203 in T1522, the CPU 201 displays a storage completion screen illustrated in FIG. 16D in a display apparatus 211. When detecting a press of a close button 1604 performed by the user, the CPU 201 returns to the display of the screen illustrated in FIG. 16A without executing a process of generating an image ID list described below. By this, the sharing of the currently-obtained original image with Read-app may be stopped.

On the other hand, when detecting a press of a return button 1605 for returning to Read-app performed by the user in the storage completion screen illustrated in FIG. 16E, the CPU 201 starts a process in T528. In T528, the CPU 201 performs the process of generating an image ID list. Specifically, first, in Write-app, an image ID list configured such that image IDs of the original images stored in T526 are associated with storage destinations is generated, and thereafter, the image ID list which is readable by the OS is stored in the HDD 204. By this, Read-app may obtain the image ID list from the OS in T531, reads the original images based on the image ID list, and uses the original images in the process of Read-app.

Subsequently, the CPU 201 performs a process of the cooperation termination phase from T528 to T531.

As described above, when the CPU 201 of the communication device 101 activates Write-app by means of Read-app, the CPU 201 determines whether the imaging apparatus 102 may perform the PUSH transmission in accordance with data formats supported by Read-app. By this, wasted processes including a process of transmitting and receiving an image of a data format which is not supported by Read-app and a process of storing such an image may be eliminated.

Although the PUSH transmission performed by the imaging apparatus 102 is prohibited taking the RAW format as the data format supported by Read-app as an example in this embodiment, the present disclosure is not limited to this. Examples of the data format supported by Read-app include data formats of moving images such as an MP4 format, an AVI format, and an MOV format and a data format of a VR image of 360 degrees.

UI of Imaging Apparatus

Next, UIs of the imaging apparatus 102 will be described with reference to FIG. 17.

Figure 17A:
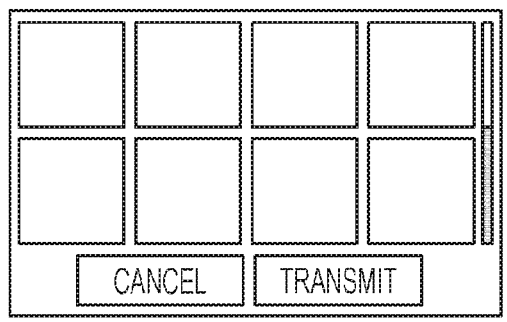
FIGS. 17A to 17D are diagrams illustrating examples of graphic user interfaces (GUIs) of the imaging apparatus according to an embodiment of the present disclosure.
Figure 17B:
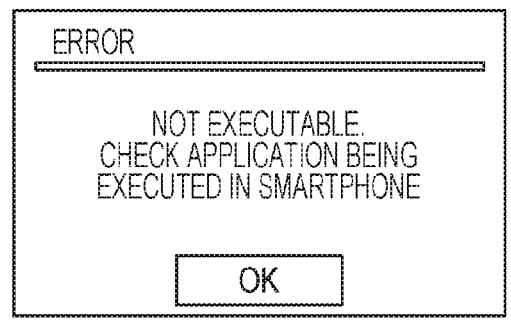
Figure 17C:
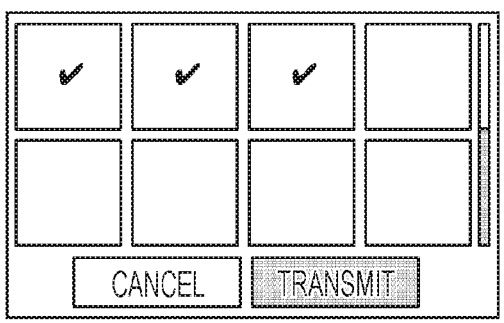
Figure 17D:
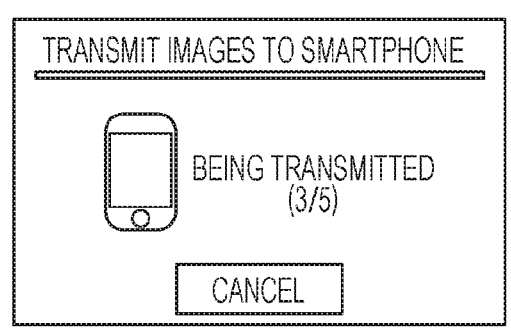

When connection between the imaging apparatus 102 and the communication device 101 in T515 is established in FIG. 15, an image selection screen for performing the PUSH transmission is displayed in the display unit 406 of the imaging apparatus 102 as illustrated in FIG. 15A. Note that when receiving a request for prohibiting the PUSH transmission from the communication device 101 through a communication unit 411 in T1519, the controller 401 brings the display unit 406 into a black-out state so as not to allow the user to select an image for the PUSH transmission. When the user performs a release operation on the imaging apparatus 102 or the like, the controller 401 displays an error indicating that the user operation is not accepted in the display unit 406 as illustrated in FIG. 17B. On the other hand, when the user selects an image by operating the display unit 406 in T1521, the controller 401 displays a screen indicating that an image to be transmitted by the PUSH transmission has been selected as illustrated in FIG. 17C. Thereafter, when the PUSH transmission is instructed by the user operation, the controller 401 displays progress of image transmission in the display unit 406 as illustrated in FIG. 17D. When the image transmission is terminated, display is updated to that illustrated in FIG. 17A.

The GUIs of the imaging apparatus 102 has been described hereinabove.

Fifth Embodiment

Hereinafter, a fifth embodiment of the present disclosure will be described with reference to the accompanying drawings. In this embodiment, a user operates a communication device 101 so as to activate an application for obtaining data using an image editing application, the data obtaining application cooperates with the image editing application, and the data obtaining application controls data transmission performed by an imaging apparatus 102 based on a data format supported by the image editing application and a type of the connected imaging apparatus 102. Note that the term "activation" of an application in this embodiment indicates a case where an inactivated application is activated and a case where an application operated in a background is brought into an active state by switching the application to a foreground.

Processing Procedure of Communication Device

A procedure of a process performed by the communication device 101 according to this embodiment will be described with reference to FIG. 18. In this embodiment, when a CPU 201 of the communication device 101 activates Write-app by means of Read-app and Write-app and Read-app cooperate with each other, the CPU 201 performs control of data transmission performed by the imaging apparatus 102 in accordance with a data format supported by Read-app and a model of the connected imaging apparatus 102.

Figure 18:
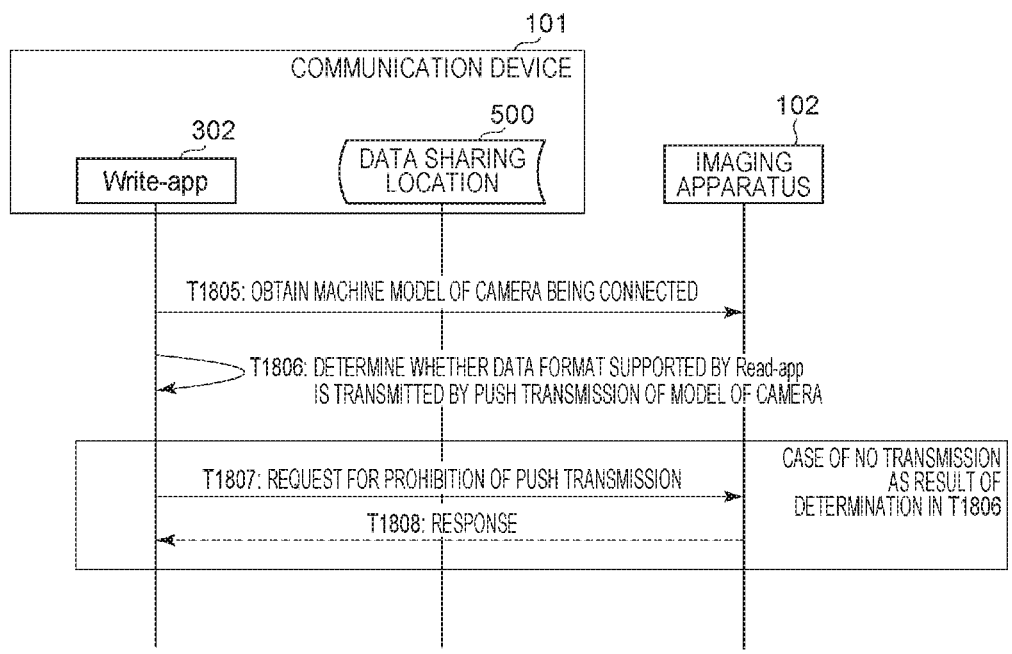
FIG. 18 is a diagram illustrating an example of a sequence of a process performed when a CPU of a communication device activates Write-app by means of Read-app and an external apparatus performs PUS transmission according to an embodiment of the present disclosure.

The process in FIG. 18 is executed after a process from T501 to T1518 in FIG. 15 is executed.

In T1805, a model of the imaging apparatus 102 connected to the communication device 101 is obtained. Here, the model of the imaging apparatus 102 corresponds to a model ID obtained from the imaging apparatus 102 when connection is established in T515. The obtained model ID is stored in a RAM 203 by the CPU 201 in a readable manner.

In T1806, the CPU 201 determines whether the imaging apparatus 102 of the target model is to transmit an image of a data format supported by Read-app by PUSH transmission based on a data format supported by Read-app which is referred to in T1517 and the type of the imaging apparatus 102 identified in T1805. When the determination is negative in T1806, the process proceeds to T1807. Note that a data format which is not transmitted by the PUSH transmission is stored in the RAM 203 in advance for each model of the imaging apparatus 102 in a state in which the data format is readable from Write-app. If the data format which is not transmitted in the PUSH transmission by the model of the connected imaging apparatus 102 is included in the data formats supported by Read-app, the process proceeds to T1807. Alternatively, the data format to be transmitted in the PUSH transmission may be set to be readable from Write-app for each model of the imaging apparatus 102 and stored in the RAM 203. In this case, when the data format to be transmitted in the PUSH transmission by the model of the connected imaging apparatus 102 is not included in the data formats supported by Read-app, the process proceeds to T1807.

In T1807, the CPU 201 transmits a PUSH transmission prohibition request to the imaging apparatus 102 through a NET I/F 209. When receiving the prohibition request from the communication device 101, a controller 401 of the imaging apparatus 102 does not accept an operation for performing the PUSH transmission or displays a dialog indicating that the operation for performing the PUSH transmission is not to be accepted in a display unit 406. In this way, the PUSH transmission of images included in the imaging apparatus 102 to the communication device 101 is prohibited.

In T1808, the CPU 201 receives a response from the imaging apparatus 102 through the NET I/F 209.

As described above, when the CPU 201 of the communication device 101 causes Read-app to cooperate with Write-app, the CPU 201 performs control of PUSH transmission performed by the imaging apparatus 102 in accordance with the data format supported by Read-app and the model of the connected imaging apparatus 102.

Although the case where the process in T1803 is performed when the connection to the imaging apparatus 102 is completed has been described, the present disclosure is not limited to this. The process in T1803 may be performed when Write-app is activated in T509.

Furthermore, the case where the model ID is used for identifying the model of the connected imaging apparatus 102 is described as an example in this embodiment. However, the present disclosure is not limited to this. For example, other information including a MAC address of the imaging apparatus 102 and a character string indicating a name of a model may be used as long as the model of the imaging apparatus 102 is specified.

Furthermore, the case where the communication device 101 receives information for identifying a model of the imaging apparatus 102 from the imaging apparatus 102 and a data format to be transmitted or a data format not to be transmitted in the PUSH transmission associated with the model of the imaging apparatus 102 is read is described in this embodiment. The present disclosure is not limited to this and the communication device 101 may receive a data format to be transmitted or not to be transmitted by the imaging apparatus 102 in the PUSH transmission from the imaging apparatus 102.

Sixth Embodiment

Hereinafter, a sixth embodiment of the present disclosure will be described with reference to the accompanying drawings. In this embodiment, a user activates Write-app by operating a communication device 101. Thereafter, the user transmits images stored in an imaging apparatus 102 to the communication device 101 by operating the imaging apparatus 102. After completion of the transmission, another application is activated and cooperates with Write-app. This case will be described hereinafter as an example. Note that the term "activation" of an application in this embodiment indicates a case where an inactivated application is activated and a case where an application operated in a background is brought into an active state by switching the application to a foreground.

Processing Procedure of Communication Device

A procedure of a process performed by the communication device 101 according to this embodiment will be described with reference to FIGS. 19A to 20D. In this embodiment, a user activates Write-app by operating a communication device 101. Thereafter, the user performs PUSH transmission by operating the imaging apparatus 102. After completion of the transmission process, another application is activated and cooperates with Write-app. This case will be described hereinafter as an example.

Note that, for simplicity of description, a period from T1901 to T1908 is determined as a connection phase, a period from T1909 to T1917 is determined as an image storage phase, and a period from T1918 to T1924 is determined as a cooperation start phase.

First, the connection phase from T1901 to T1908 will be described.

At T1901, the CPU 201 of the communication device 101 receives a request for activating Write-app issued by a user's operation.

Subsequently, in T1902, a process is started when the CPU 201 activates Write-app in response to the activation request in T1901. When activating Write-app, the CPU 201 displays a screen illustrated in FIG. 20A in a display apparatus 211.

When the imaging apparatus 102 turns on a communication mode when the user operates the imaging apparatus 102 in T1903, the imaging apparatus 102 activates a function of access point in T1904.

In T1905, the communication device 101 is connected to the access point of the imaging apparatus 102 in response to an operation performed by the user on the communication device 101.

In T1906, the CPU 201 receives a notification indicating that the imaging apparatus 102 has been detected from the OS in Write-app. In T1907, the CPU 201 transmits a connection request to the imaging apparatus 102.

In T1908, the imaging apparatus 102 authenticates the communication device 101 so that connection between the imaging apparatus 102 and the communication device 101 is established.

The connection phase has been described hereinabove.

Next, the image storage phase in the period from T1909 to T1917 will be described.

In T1909, the user operates the imaging apparatus 102 so as to select an image to be transmitted from among the images included in the imaging apparatus 102 and instructs the PUSH transmission. The imaging apparatus 102 transmits a request for performing the PUSH transmission to the communication device 101 in response to an instruction issued by the user.

In T1910, the CPU 201 receives a PUSH transmission request from the imaging apparatus 102 through the NET I/F 209. The PUSH transmission request includes list information indicating information on original images selected by the user using the imaging apparatus 102 in T1909. In T1911, the CPU 201 stores the list information in the RAM 203 as a storage candidate image list in a state in which the list information is readable from Write-app.

When receiving the PUSH transmission request from the imaging apparatus 102, the CPU 201 transmits a request for obtaining attribute information corresponding to a captured image (an original image) based on the storage candidate image list stored in the RAM 203 to the imaging apparatus 102 through the NET I/F 209 in T1911. Although a case where the attribute information is a thumbnail image will be described in this embodiment, the present disclosure is not limited to this and the attribute information may be a file name.

A format of data on the original image and a format of data on the attribute information may be the same or different from each other. For example, the original image and the thumbnail image may be still-image files of a JPEG format. Alternatively, the original image may be a moving-image file of an MP4 format and the attribute information may be a still-image file of a JPEG format extracted from the moving-image file. In this embodiment, at least a data format of attribute information of an original image is supported by Write-app irrespective of whether a format of the original image is supported by Read-app.

In T1912, the CPU 201 receives thumbnail images and information indicating data formats of the original image corresponding to the individual thumbnail images from the imaging apparatus 102 through the NET I/F 209 and stores the information in the HDD 204. The thumbnail images have resolution lower than that of the original images, and therefore, data sizes of the thumbnail images are small.

Figure 20A:
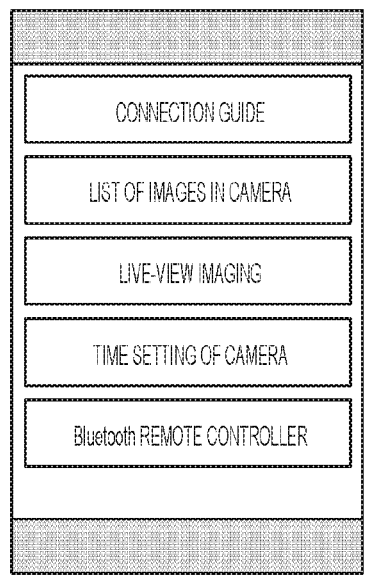
FIGS. 20A to 20D are diagrams illustrating examples of a display screen of Write-app according to an embodiment of the present disclosure.
Figure 20B:
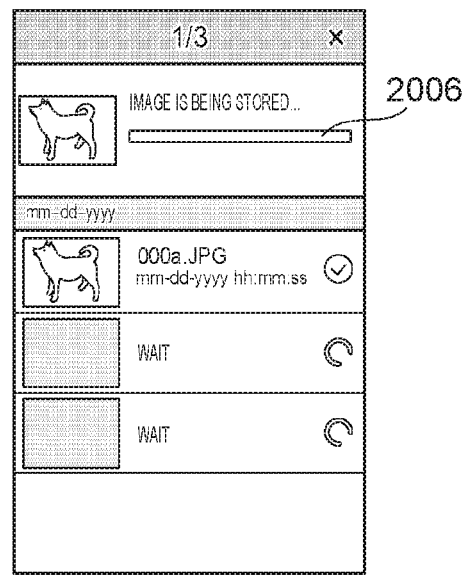

In T1913, the thumbnail images stored in the HDD 204 are read and displayed in the display apparatus 211. Here, a GUI illustrated in FIG. 20B is displayed in Write-app. FIG. 20B is a diagram illustrating a state in which, every time a thumbnail image is read, the thumbnail image is successively added to a screen. An original image corresponding to a thumbnail image has not been received from the imaging apparatus 102, and therefore, a progress bar 2006 indicates 0%.

In T1914, the CPU 201 transmits a request for obtaining the original image based on the storage candidate image list stored in the RAM 203 to the imaging apparatus 102 through the NET I/F 209 in T1910.

In T1915, the CPU 201 receives the original images requested in T524 from the imaging apparatus 102 through the NET I/F 209. Here, the original image has a data format to be transmitted in the PUSH transmission by the imaging apparatus 102, that is, a JPEG format in this embodiment, for example.

When reception of the original images is completed, the CPU 201 performs a process of storing the original images using Write-app in T1916. Specifically, the CPU 201 stores a file of the original images received in T1915 in the HDD 204, and assigns image IDs to the original images which are newly stored in step T1917. The image IDs are described as codes corresponding to file paths of storage destinations of the original images. Note that the image ID may be a file path of the storage destination.

Note that the process from the request of the original images performed in T1914, the original image reception process performed in T1915, the original image storage process performed in T1916, to the process of issuing the image IDs corresponding to the original images performed in T1917 is repeatedly performed a number of times corresponding to the number of storage candidate image lists stored in the RAM 203 in T1910. While the series of the operations of the image storage process is performed, the CPU 201 displays a storage progress screen illustrated in FIG. 20B in the display apparatus 211.

The image storage phase has been described hereinabove.

Next, the cooperation start phase from T1918 to T1924 will be described.

As described with reference to the process from T1911 to T1917, when a process of storing all original images corresponding to the storage candidate image list stored in the RAM 203 is terminated in T1910, the CPU 201 displays a storage completion screen illustrated in FIG. 20C in the display apparatus 211. When detecting a press of a close button 1202 performed by the user, the CPU 201 returns to the display of the screen illustrated in FIG. 20A without executing a process of generating an image ID list described below.

Figure 20C:
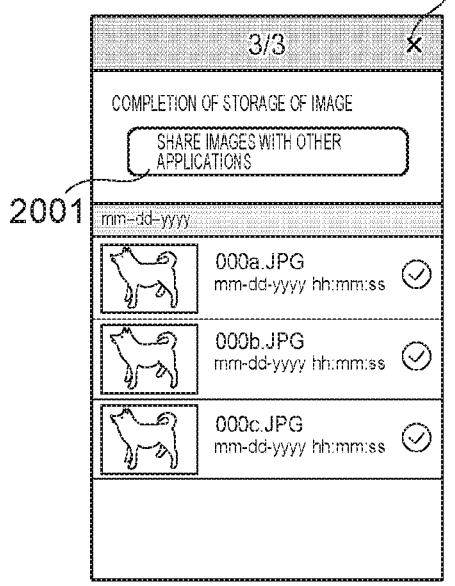

On the other hand, when detecting a press of a button 2002 for sharing an image with another application in the storage completion screen illustrated in FIG. 20C, the CPU 201 receives an instruction for cooperation with the other application in T1918 and performs a subsequent process. In T1919, the CPU 201 performs the process of generating an image ID list. Specifically, first, in Write-app, an image ID list configured such that image IDs of the original images stored in T1915 are associated with storage destinations is generated, and thereafter, the image ID list which is readable by the OS is stored in the HDD 204. By this, Read-app may obtain the image ID list from the OS in T1924 described below, obtain the original images based on the image ID list, and use the original images in the process of Read-app.

In T1920, the CPU 201 obtains a format list including data formats supported by Read-apps with reference to a data sharing location 500.

Figure 20D:
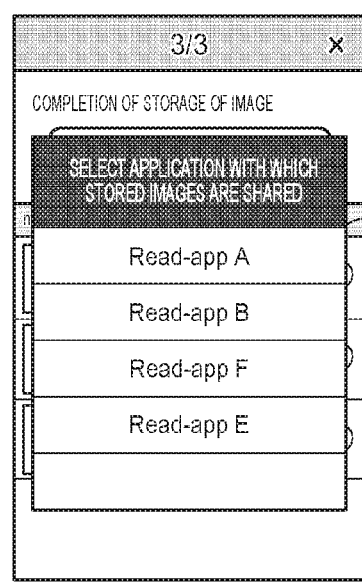

In T1921, the CPU 201 displays a cooperation destination list 2003 in the display apparatus 211 as illustrated in FIG. 20D. In this case, the CPU 201 does not display Read-apps corresponding to data formats which are not used in the PUSH transmission by the imaging apparatus 102 (a RAW format, for example, in this embodiment) in the cooperation destination list 2003 among data formats supported by Read-app obtained in T1920. Specifically, applications corresponding to data formats to be transmitted in the PUSH transmission by the imaging apparatus 102 are displayed in the cooperation destination list 2003.

In T1922, the CPU 201 selects Read-app in response to a user operation performed on the cooperation destination list 2003. In T1923, the CPU 201 causes an OS to issue a request for activating Read-app selected in T1922 so as to activate Read-app and Read-app is cooperated with Write-app.

In T1924, the CPU 201 receives the image ID list generated by Write-app in T1919 through the OS from Read-app.

Thereafter, the CPU 201 obtains the original images from the HDD 204 based on the image ID list from Read-app and adds the original images in a list display screen of Read-app to be displayed.

Note that although the RAW format is taken as an example of the data format not to be transmitted in the PUSH transmission by the imaging apparatus 102 in this embodiment, the present disclosure is not limited to this. For example, even in a case of a data format of a moving image, such as MP4, instead of the RAW format, the data format may be similarly applied. Although the CPU 201 does not display applications corresponding to data formats not to be transmitted in the PUSH transmission by the imaging apparatus 102 in the cooperation destination list, the present disclosure is not limited to this and such applications may be displayed in a non-selectable manner.

As described above, even in a case where the user selects an image by operating a camera so as to transmit the image to a smartphone, when an information processing apparatus obtains data from an external apparatus and processes the obtained data, a data obtaining process is prevented from being unnecessarily performed.

Accordingly, usability is improved and loads of communication and a storage capacity may be reduced.

Although the case where Write-app is an application to be used by the communication device 101 for obtaining an image from the imaging apparatus 102 is described as an example in the foregoing embodiments, applications of other usages may be employed as Write-app. For example, an application for searching a database for an image or an application for performing an imaging process may be employed as Write-app. Furthermore, although image data is processed in the foregoing embodiments, other data including audio data may be processed instead of image data.

Although the case where a smartphone corresponds to the communication device 101 is described as an example in the foregoing embodiments, any device may be employed as long as an application may be installed. For example, a cellular phone, a tablet computer, a personal computer (PC), or the like may be similarly employed as the communication device 101. Furthermore, in a case where Read-app and Write-app do not require a communication function, the communication function may be omitted, and the present disclosure is broadly embodied by any information processing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-128041 filed Jun. 29, 2017, Japanese Patent Application No. 2018-041194 filed Mar. 7, 2018, and Japanese Patent Application No. 2018-041195 filed Mar. 7, 2018, which are hereby incorporated by reference herein in their entirety.

What is claimed is:

1. An information processing apparatus including a plurality of installed application programs, the information processing apparatus comprising:
an activation unit configured to activate, when a first application program is executed for using data, a second application program used to obtain the data from an external apparatus;
a storage unit configured to store a data format usable by the first application program in a memory;
a connection processing unit configured to execute a process of connection to the external apparatus by executing the second application program;
an obtaining unit configured to obtain a data format and attribute information stored in the external apparatus from the external apparatus by executing the second application program; and
a display unit configured to display the attribute information on data stored in the external apparatus on a screen of the second application program such that a result of a determination as to whether the data is usable by the first application program is recognizable based on a format stored in the memory and a format obtained from the external apparatus by executing the second application program.

2. The apparatus according to claim 1, wherein the display unit performs display such that a display form of the attribution information of the data is changeable in accordance with a result of the determination as to whether the data is usable by the first application program.

3. The apparatus according to claim 1, wherein the display unit does not display the attribute information of the data which is not usable by the first application program.

4. The apparatus according to claim 1, further comprising:
a selection unit configured to select one of attribute information displayed in the screen of the second application program; and a request unit configured to request data corresponding to the selected attribute information by executing the second application program, wherein the obtaining unit further obtains the requested data from the external apparatus.

5. The apparatus according to claim 4, wherein the data is obtained from the external apparatus through conversion based on the data format usable by the first application program.

6. The apparatus according to claim 4,
wherein the storage unit further stores a size of data usable by the first application program, and
wherein the obtained data is resized by the external apparatus based on a size of the data usable by the first application program.

7. The apparatus according to claim 4, further comprising:
a storage unit configured to store a path to the obtained data in a predetermined storage region;
a reading unit configured to read the data along the path stored in the predetermined storage region by executing the first application program; and
an editing unit configured to execute an editing process on the read data by executing the first application program.

8. The apparatus according to claim 1, further comprising:
an instruction unit configured to transmit an instruction for prohibiting transmission of data selected by the external apparatus to the information processing apparatus from the external apparatus by executing the second application program.

9. The apparatus according to claim 8, wherein the instruction unit transmits the instruction to the external apparatus based on a data format usable by the first application program and a data format transmittable by the external apparatus.

10. The apparatus according to claim 8, wherein the instruction unit transmits the instruction to the external apparatus in accordance with a data format usable by the first application program and a model of the external apparatus.

11. The apparatus according to claim 1, wherein the attribute information is a thumbnail image.

12. A method for controlling an information processing apparatus including a plurality of installed application programs, the method comprising:
activating, when a first application program is executed for using data, a second application program used to obtain the data from an external apparatus;
storing a data format usable by the first application program in a memory;
executing a process of connection to the external apparatus by executing the second application program;
obtaining a data format and attribute information stored in the external apparatus by executing the second application program; and
displaying the attribute information on data stored in the external apparatus on a screen of the second application program such that a result of a determination as to whether the data is usable by the first application program is recognizable based on a format stored in the memory and a format obtained from the external apparatus by executing the second application program.

13. A non-transitory computer-readable storage medium storing a second application program, which is activated when a first application program is executed for using data, that when executed by a processor, cause the processor to perform operations comprising:
executing a process of connection to the external apparatus;
obtaining a data format and attribute information which are stored in the external apparatus from the external apparatus; and
displaying the attribute information on data stored in the external apparatus on a screen of the second application program such that a result of a determination as to whether the data is usable by the first application program is recognizable based on a format stored in the memory and a format obtained from the external apparatus by executing the second application program.

* * * * *